(12) United States Patent
Wakashiro et al.

(10) Patent No.: US 6,934,610 B2
(45) Date of Patent: Aug. 23, 2005

(54) CONTROL APPARATUS FOR HYBRID VEHICLE

(75) Inventors: Teruo Wakashiro, Wako (JP); Atsushi Matsubara, Wako (JP); Shinichi Kitajima, Wako (JP); Hideyuki Takahashi, Wako (JP); Kan Nakaune, Wako (JP); Toshinari Shinohara, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/036,412

(22) Filed: Jan. 7, 2002

(65) Prior Publication Data

US 2002/0115532 A1 Aug. 22, 2002

(30) Foreign Application Priority Data

Feb. 20, 2001 (JP) ..................................... P2001-043932

(51) Int. Cl.$^7$ .............................. F02B 75/06; G06F 7/00
(52) U.S. Cl. ........................ 701/22; 701/86; 180/65.2; 318/376
(58) Field of Search .............................. 701/22, 54, 84, 701/86, 101, 103, 104, 108, 112; 180/65.1, 65.2; 290/40; 318/376; 123/192.1

(56) References Cited

U.S. PATENT DOCUMENTS 6,013,992 A * 1/2000 Ishikawa et al. ............. 318/376
6,334,079 B1 * 12/2001 Matsubara et al. ............ 701/22
6,424,053 B1 * 7/2002 Wakashiro et al. ........ 290/40 C
6,487,998 B1 * 12/2002 Masberg et al. ......... 123/192.1

* cited by examiner

Primary Examiner—Thomas G. Black
Assistant Examiner—Arthur D. Donnelly
(74) Attorney, Agent, or Firm—Armstrong, Kratz, Quintos, Hanson & Brooks, LLP

(57) ABSTRACT

A control apparatus for a hybrid vehicle for generating an appropriate amount of regeneration energy during deceleration. A control apparatus for a hybrid vehicle including an engine and electric motor for driving the hybrid vehicle wherein the engine comprises cylinders capable of deactivated operations and the motor executes regenerative braking when the vehicle is decelerating. The control apparatus of the present invention includes a cylinder deactivation determination device for determining whether or not the vehicle speed is appropriate for executing the cylinder deactivated operation, a regeneration amount calculating device for detecting whether the vehicle state is appropriate for regeneration and calculates the amount of regeneration; and further includes a compensation amount calculating device that compensates the amount of regeneration based on an all cylinder deactivated operation and the engine rotation speed.

5 Claims, 14 Drawing Sheets

CONTROL APPARATUS FOR HYBRID VEHICLE

BACKGROUND OF THE INVENTION

1. Field of the Invention

The present invention relates to a control system for a hybrid vehicle, and in particular, to a control system for a cylinder deactivating type hybrid vehicle that can guarantee an appropriate amount of regeneration during deceleration.

2. Description of the Related Art

Conventionally, hybrid vehicles which carry motors as power sources for driving the vehicles in addition to the engine are known. There are two types of hybrid vehicles, and one of which is parallel hybrid vehicles in which the output of the engine is assisted by an electric motor.

This parallel hybrid vehicle assists the output of the engine by an electric motor during acceleration, and various controls such as carrying out the charging of the battery and the like by regenerative breaking during deceleration are executed, and while guaranteeing the remaining charge (electrical energy) of the battery, the demands of the driver can be satisfied. In addition, because structurally a mechanism that disposes the engine and electric motor in a straight row is formed, there are the merits that the structure can be simplified and the weight of the system as a whole can be made small, and the freedom of the mounting in the vehicle is high.

Here, in this parallel hybrid vehicle, a structure providing a clutch between the engine and electric motor in order to eliminate the influence of friction (engine brake) of the engine during regenerative braking (see for example, Japanese Unexamined Patent Application, First Publication, No. 2000-97068) and a structure in which the engine, electric motor, and transmission are joined in a series in order to implement an extreme simplification (see for example, Japanese Unexamined Patent Application, First Publication, No. 2000-125405) are known.

However, the former structure providing a clutch between the engine and electric motor as described above has the drawbacks of introducing complicates relating to the structure by providing a clutch and worsening mountability, and at the same time, the transfer efficiency of the transmission system deteriorates even during travel as a result of using a clutch. In contrast, a later structure in which the engine, electric motor, and transmission are joined in a series decreases the amount of regenerative braking by the amount of the friction equivalent to the engine described above, and thus there are the problems that the electrical energy that can be guaranteed by regeneration becomes small, and therefore, the amount of assistance that the electric motor provides is limited.

In addition, as a means of decreasing the friction of the engine during deceleration in the former type, there is the method of controlling the throttle valve at the opening side during deceleration using an electric control throttle mechanism and thus increasing the amount of regeneration by greatly decreasing the pumping loss. However, because new air flows as-is into the exhaust system in large amounts during deceleration, there is the problem that the temperatures of the catalyst and A/F sensor decrease, and this has harmful effects on the optimal control of the exhaust gas.

Thus, the present invention has the object of providing a control system for a hybrid vehicle that improves fuel consumption by the amount equivalent to the decrease in the engine friction decreases by making possible all cylinders deactivated operation, and at the same time, guarantees an optimal amount of regeneration during deceleration.

SUMMARY OF THE INVENTION

In a first aspect of the present invention, a control apparatus for a hybrid vehicle that provides an engine (for example, the engine E in the embodiment) and electric motor (for example, the electric motor M in the embodiment) as drive power for a vehicle and carried out regenerative control by the electric motor depending on the state of deceleration during deceleration of the vehicle, is characterized in that the engine is an engine that can deactivate cylinders and provides a cylinder deactivation determination device (for example, the all cylinders deactivated execution flag F_ALCS in the embodiment) that determines whether or not cylinder deactivation is possible depending on the operating conditions of the vehicle and a regeneration amount calculating device (for example, step S255 in the embodiment) that detects a state of deceleration of a vehicle and calculated the amount of regeneration due to the electric motor during deceleration; and further characterized in that the regeneration amount calculating device provides a compensation amount calculating device (for example, step S309 in the embodiment) that compensates the amount of regeneration based on a compensation amount (for example, the all cylinders deactivated regeneration operation value CSRGN in the embodiment) calculated depending on the engine rotation speed (for example, the engine rotation speed NE in the embodiment) in the case that the cylinder deactivation determination device determines that cylinder deactivation execution is possible during decelerative regeneration by the electric motor; and further characterized in that the electric motor carries out regeneration depending on the amount of regeneration based on the regeneration amount calculating device and compensation amount calculating device.

By having this type of structure, regeneration can be carried out by calculating the decreased portion of the engine friction that decreases due to the cylinder deactivation by the compensation amount calculating device, and carrying out regeneration by increasing the amount of the regeneration calculated by the regeneration amount calculating device by an amount equivalent to this compensation amount (the increased portion of the regeneration).

A second aspect of the present invention is characterized in providing a control apparatus for a hybrid vehicle wherein a fuel supply stoppage device (for example, step S212 in the embodiment) that stops the fuel supply to the engine during vehicle deceleration.

By having this type of structure, in addition to being able to increase the amount of regeneration by carrying out cylinder deactivation, the amount of fuel consumption can be restrained.

A third aspect of the present invention is characterized in that the compensation of the amount of regeneration by the compensation amount calculation device is gradually carried out (for example, steps S261 and S265 in the embodiment) after the passage of a predetermined time interval that depends on the vehicle speed (for example, step S257 in the embodiment).

In this manner, the freedom of the settings is increased by setting the predetermined time that depends on the vehicle speed according to vehicle speed. In addition, by gradually carrying out compensation of the amount of regeneration, in the case of entering the deceleration mode and the case of leaving the deceleration mode, a smooth transition can be realized.

A fourth aspect of the present invention is characterized in that the compensation amount calculation device provides an intake negative pressure compensation device (for example, step S311 in the embodiment) that carries out compensation depending in the engine intake negative pressure during cylinder deactivation execution and cylinder deactivation release by a cylinder deactivation determination device.

By having this type of structure, compensation that depends on the intake pipe negative pressure that changes between the normal operation and cylinder deactivated operation becomes possible.

A fifth aspect of the invention is characterized in that the gear ratio of the gear box (for example, the CVT in the embodiment) is changed so as to increase the gear ratio on the input side of the gear box in the case the cylinder deactivation determination device determines that cylinder deactivation execution is possible, and the engine rotation speed are increased.

By having this type of structure, guaranteeing the regeneration energy corresponding to the engine friction that has decreased due to the cylinder deactivation by increasing the engine rotation speed becomes possible.

BRIEF DESCRIPTION OF THE DRAWINGS

FIG. 3A is a cross-sectional drawing of the essential elements of the variable valve timing mechanism during the state of all cylinders activated driving, and FIG. 3B is a cross-sectional drawing of the essential elements of the variable valve timing mechanism during the state of no cylinder driving.

DETAILED DESCRIPTION OF THE PREFERRED EMBODIMENT

Below, an embodiment of the present invention will be explained referring to the figures.

Figure 1:
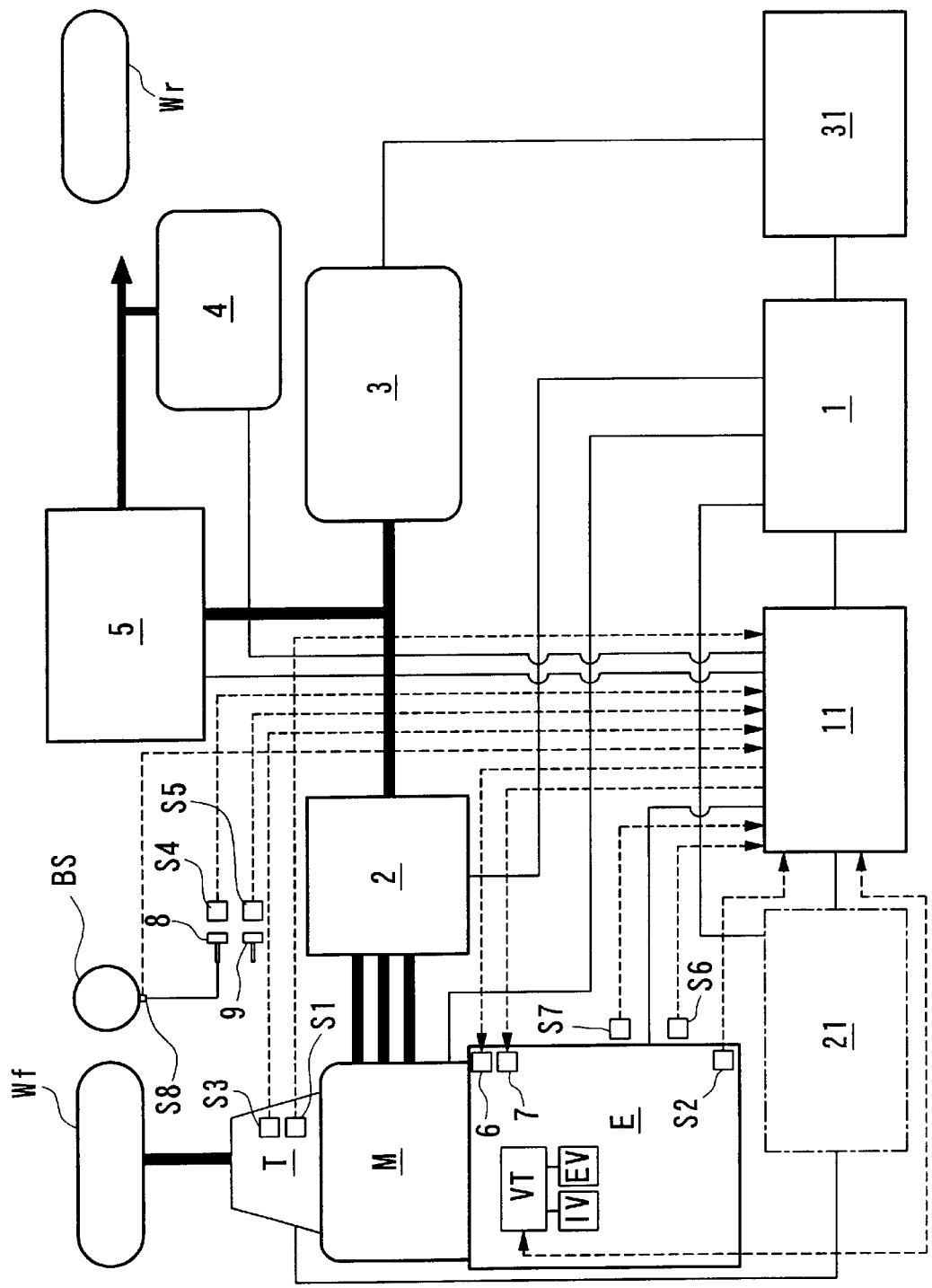
FIG. 1 is a conceptual structural drawing showing the parallel hybrid vehicle of the preferred embodiment of the present invention.

FIG. 1 shows a parallel hybrid vehicle according to the embodiment of the present invention, and is structured such that the engine E, the electric motor M, and the transmission T are coupled in series. The driving force of both the engine E and the electric motor M is transmitted to the front drive wheels Wf and Wf via a transmission comprising either an automatic transmission or a manual transmission. In addition, during deceleration of the hybrid vehicle, when drive force is transmitted from the front wheel Wf and Wf side to the electric motor M side, the electric motor M functions as a generator and generates what is called regenerative braking force, and the kinetic energy of the vehicle body is recovered as electrical energy. Here, Wr denotes the rear wheels.

The drive of the electric motor M and the regenerative actions are carried out by a power drive unit 2 that receives the control command from the electric motor ECU 1. The electric motor M and a high-voltage battery that delivers and receives the electrical energy are connected to the power drive unit 2, and in the battery 3, for example, a unit module that serially connects a plurality of cells is in turn connected serially to a plurality of modules. In the hybrid vehicle, a 12 volt auxiliary battery 4 for driving the various types of devices is mounted in the hybrid engine, and this auxiliary battery 4 is connected to the battery 3 via the down converter 5. The down converter 5 that is controlled by the FIECU 11 charges the auxiliary battery after stepping down the voltage of the battery 3.

In addition to the electric motor ECU 1 and the down converter 5, the FIECU 11 carries out the operation of the fuel supply amount control device 6 that controls the fuel supply amount to the engine E and the operation of the starter electric motor 7, in addition to the ignition timing and the like. Because of this, the FIECU 11 inputs a signal from the vehicle speed sensor S1 that detects the vehicle speed V based on the number of rotation speeds of the drive axle of the machine; a signal from the engine rotation speed sensor S2 that detects the number of engine rotations NE, a signal from the position sensor S3 that detects the shift position of the transmission T; a signal from the brake switch S4 that detects the operation of the brake pedal 8; a signal from the clutch switch 55 that detects the operation of the clutch pedal 9; a signal from the throttle opening sensor S6 that detects the throttle opening TH, and a signal from the intake pipe negative load sensor S7 that detects the intake pipe negative pressure PGBA. Reference numeral 31 denotes the battery ECU that preserves the battery 3 and calculates the remaining charge QBAT of the battery 3. Moreover, in FIG. 1 in the case of a CVT vehicle, as is shown by the chain line, a CVTECU 21 for controlling the CVT is provided.

BS denotes the booster apparatus that communicates with the brake pedal 8, and a negative pressure sensor S8 that detects the negative pressure in the break master force (MPGA) is provided in the booster apparatus BS.

Moreover, this negative pressure sensor S8 is connected to the engine ECU 11.

Here, the engine E described above is a deactivated cylinder engine that freely switches between all cylinder activated operation (normal operation) in which all cylinders are operated and all cylinders deactivated driving operation in which all cylinders are disabled. As shown schematically in FIG. 1, the intake valve IV and the exhaust valve EV of each of the cylinders of the engine E are structured such that the operation can be deactivated by the variable valve timing mechanism VT. Here, the variable valve timing mechanism VT is connected to the engine ECU 11.

Figure 2:
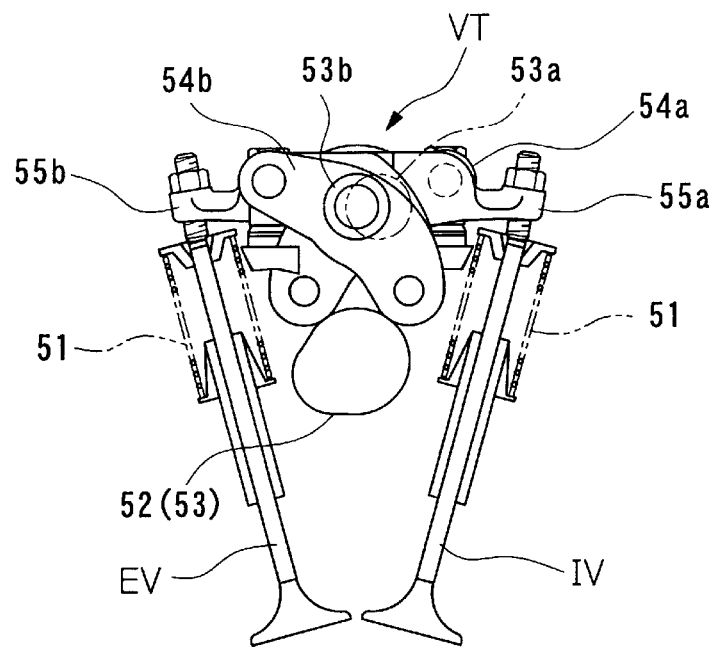
FIG. 2 is a frontal view showing the variable valve timing mechanism of the preferred embodiment.

This will be concretely explained referring to FIG. 1 and FIG. 2.

FIG. 2 shows an example of applying a variable valve timing mechanism VT for the all cylinders deactivated operation to a single overhead cam (SOHC) engine. A cylinder (not illustrated) is provided with an intake valve IV and an exhaust valve EV, and the intake valve IV and the exhaust valve EV are urged in the direction that closes the intake and exhaust ports (not illustrated) by the valve springs 51 and 51. In contrast, reference numeral 52 is a lift cam provided on the cam shaft 53, and this lift cam 52 communicates with rocker arms 54a and 54b for the intake valve side and exhaust valve side cam lift rotatably supported by the intake valve side and exhaust valve side rocker arm shafts 53a and 53b.

In addition, the rocker arms 54a and 43b for cam lift are in proximity to each of the rocker arm shafts 53a and 53b, and thereby the rocker arms 55a and 55b for the valve drive are rotatably supported. In addition, the rotating end of the rocker arms 55a and 55b for valve drive press the upper end of the intake valve IV and the exhaust valve EV, and thereby the opening operations of the intake valve IV and the exhaust valve EV are carried out. Moreover, a round cam 531 provided on the cam shaft 53 is slidably formed on the proximal end side (the side opposite to the valve abutting part) of the rocker arms 55a and 55b for valve drive.

FIG. 3 is an example of the exhaust valve side, and shows the rocker arm 54b for the cam lift and the rocker arm 55b for valve drive.

Figure 3A:
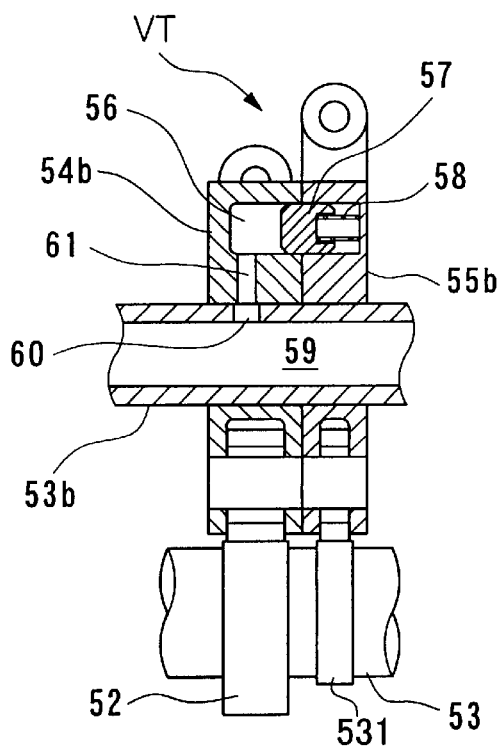
FIGS. 3A and 3B show the variable valve timing mechanism of the preferred embodiment, where
Figure 3B:
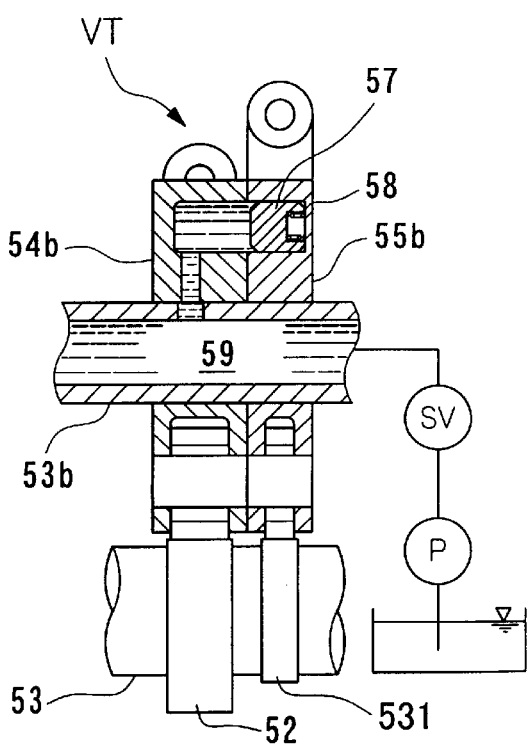

In FIG. 3A and FIG. 3B, on the rocker arm 54b for cam lift and the rocker arm 55b for valve drive, centered on the rocker arm shaft 53b on the exhaust valve side, an oil pressure chamber 56 is formed that extends between the rocker arm 54b for cam lift and the rocker arm for valve drive on the side opposite to the lift cam 52. In the oil pressure chamber 56, a pin 57 is provided freely slidably, and this pin 57 is urged towards the rocker arm 54 for cam lift by the pin spring 58.

In contrast, an oil pressure feed duct 59 is formed inside the rocker arm shaft 53b on the exhaust valve side, and this oil pressure feed duct 59 communicates with the oil pressure chamber 56 via the communication path 61 of the rocker arm 54b for cam lift. In this oil pressure feed duct 59, by switching a spool valve SV that serves as an actuator, the working fluid is supplied form the oil pump P. The solenoid of the spool valve SV is connected to the engine ECU 11.

Here, in the case that the oil pressure from the oil pressure feed duct 59 is not functioning, as shown in FIG. 3A, the pin 57 becomes positioned so as to straddle the rocker arm 54b for cam lift and the rocker arm 55b for valve drive by the pin spring 58, and at the same time, in the case that the oil pressure from the oil pressure supply duct 59 acts due to the cylinder deactivate signal, as shown in FIG. 3B, the pin 57 slides towards the rocker arm 55b for the valve drive side due to the resistance of the pin spring 58, and the coupling between the rocker arm 54b for cam lift and the rocker arm 55b for valve drive is released. Moreover, the structure is identical for the intake valve side.

Therefore, in the case that the all cylinders deactivated condition described below is satisfied and the all deactivated cylinders release condition does not obtain, the solenoid of the spool valve SV is turned ON by a signal from the engine ECU 11 (F_ALCS=1), and the oil pressure acting in the oil pressure chamber 56 from the oil pressure feed duct 59 on both the intake valve side and the exhaust valve side. Thereby, the pins 57 and 57 that integrated the rocker arms 54a and 54b for cam lift and the rocker arms 55a and 55b for valve drive slide towards the rocker arms 55a and 55b for valve drive, and the coupling between the rocker arms 54a and 54b for cam lift and the rocker arms 55a and 55b for valve drive is released.

Thus, the rocker arms 54a and 54b for cam lift are driven by the rotating motion of the lift cam 52, but the rocker arms 55a and 55b for valve drive whose coupling with the rocker arms 54a and 54b for cam lift has been released by the pin 57 are not driven by the round cam 531 that is slipping and not driven by the rocker arms 54a and 54b for cam lift, and thereby neither of the open valves IV nor EV can make a contribution. Thereby, each of the valves IV and EV remain closed, and all cylinders deactivated operation becomes possible.

MA (Motor) Basic Mode

Next, the MA (electric motor) basic mode that determines in which mode to operate the electric motor M will be explained based on the flowcharts in FIG. 4 and FIG. 5.

Moreover, this processing is repeated at a predetermined cycle.

Here, included in the MA (electric motor) basic mode are the "idle mode", "idle stop mode", "deceleration mode", "cruise mode", and the "acceleration mode". In the idle mode, the fuel supply following a fuel cut is recommenced, and the engine E is maintained in the idle state, and in the idle stopped mode, for example, the engine is stop under constant conditions while the vehicle is stopped. In addition, in the deceleration mode, regenerative braking is carried out by the electric motor M; in the accelerating mode, the engine E is assisted by the electric motor M; and in the cruise mode, the vehicle in which the electric motor M is not driven travels due to the drive force of the engine E. In the decelerating mode, all the cylinders are deactivated.

Figure 4:
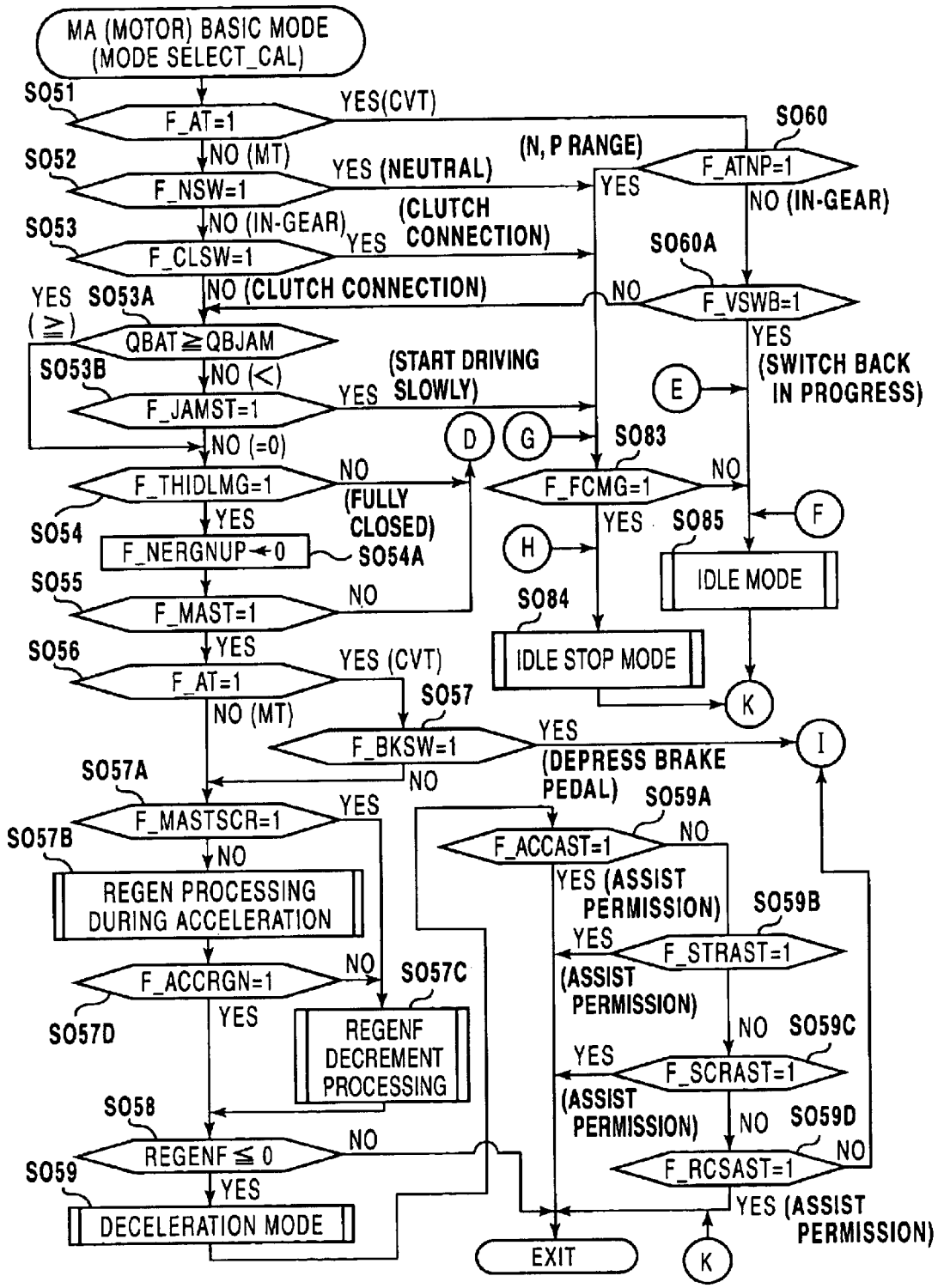
FIG. 4 is a flowchart showing the MA (electric motor) basic mode of the embodiment.
Figure 5:
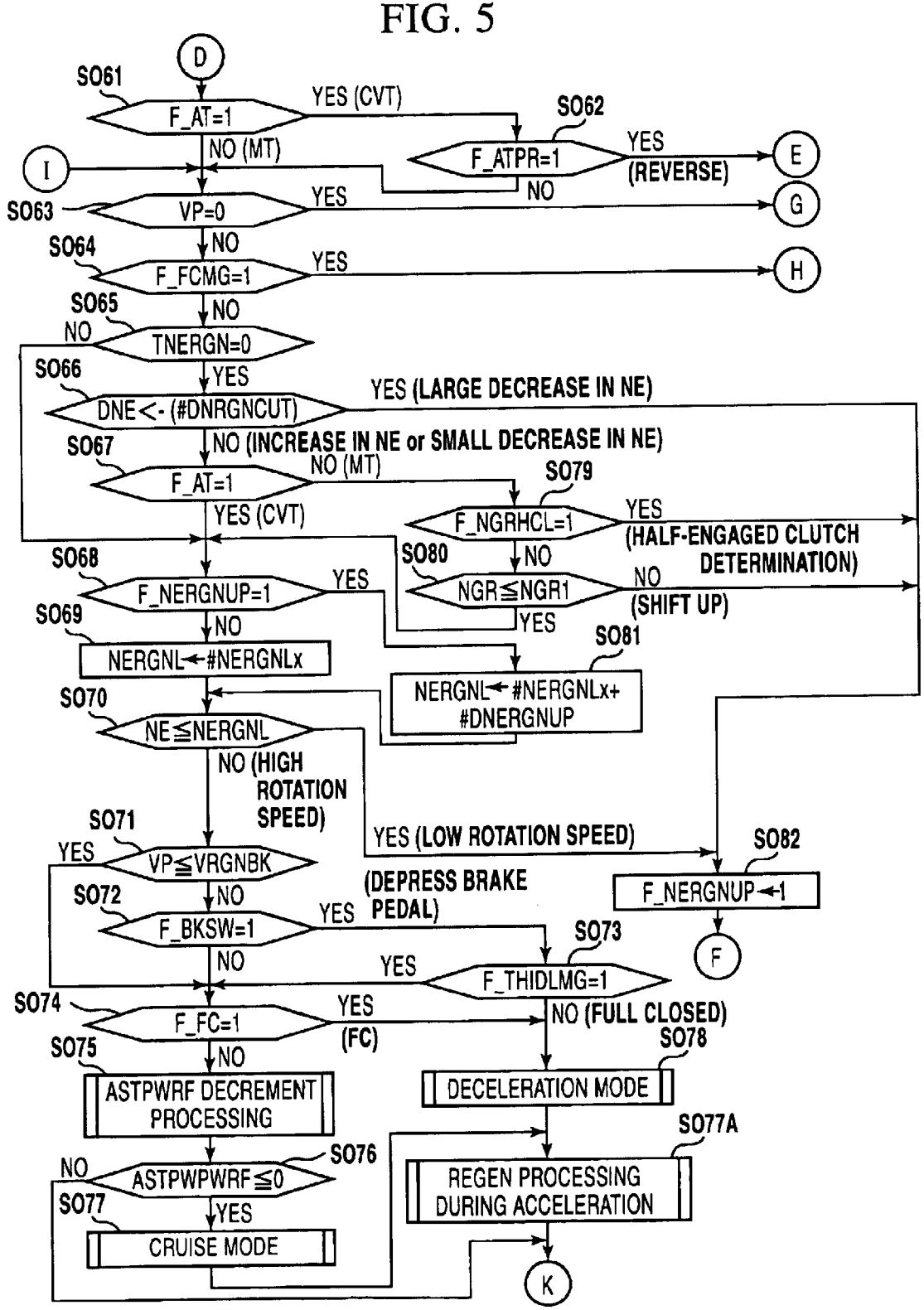
FIG. 5 is a flowchart showing the MA (electric motor) basic mode of the embodiment.

In step S051 of FIG. 4, it is determined whether or not the MT/CVT determination flag F_AT is 1. In the case that the result of the determination is YES (a CVT car), the flow proceeds to step S060, and in the case that the result of the determination is NO (MT vehicle), the flow proceeds to step S052.

In step S060, it is determined whether or not the CVT in-gear determination flag F_ATNP is 1. In the case that the result of the determination is YES (N, P range), the flow proceeds to step S083, and in the case that the result of the determination is NO (in-gear), the flow proceeds to step S060A.

In step S060A, it is determined by whether or not switch back is in effect (the shift position during shift lever operation cannot be specified) by whether or not the switch back flag F_VSWB is 1. In the case that the result of the determination is YES (during switch back) the flow proceeds to step S085, moves to the "idle mode", and completes control. In the idle mode, the engine E is maintained in the idle state. In the case that the result of the determination in step S060A is NO (not during switch back), the flow proceeds to step S053A.

In step S083, it is determined whether or not the engine stop control executing flag F_FCMG is 1. In the case that the result of the determination in step S083 is NO, the engine moves to the "idle mode" in step S085, and the control ends. In the case that the result of the determination in step S083 is YES, the flow proceeds to step S084, the engine moves into the "idle stop mode", and the control ends. In the idle stop mode, for example, the engine is stopped under constant conditions while the vehicle is stopped and the like.

In step S052, it is determined whether or not the neutral position determination flag F_NSW is 1. In the case that the result of the determination is YES (neutral position), the flow proceeds to step S083, and in the case that the result of the determination is NO (in-gear), the flow proceeds to step S053.

In step S053, it is determined whether or not the clutch connection determination flag F_CLSW is 1. In the case that the response of the determination is YES (clutch disconnected), the flow proceeds to step S083, and in the case that the result of the determination is NO (clutch connected), the flow proceeds to step S053A.

In step S053A, it is determined whether or not the remaining battery capacity QBAT is equal to or greater than the low speed propulsion determination remaining battery capacity QBJAM. In the case that the result of the determination is YES, the flow proceeds to step S054, and in the case that the result of the determination is NO, the flow proceeds to step S053.

In step S053B, it is determined whether or not the low velocity propulsion determination flag F_JAMST is 1. This low speed propulsion determination flag F_JAMST is a flag that takes the flag value 1 in the case of stop-and-go driving with propulsion at low velocity and the velocity does not increase. In the case that the result of the determination in step S053B is YES, the flow proceed to step S083. In the case that the result of the determination in step S053B is NO, the flow proceeds to step S054. Specifically, in the case in which the remaining charge of the battery is low and stop-and-go driving is occurring, the idle mode or the idle stop mode (generating electricity during idle or stopping the engine during the engine stop determination described above) are preferable also in the sense that there is no intension to accelerate and the battery is protected.

In step S054, it is determined whether or not the IDLE determination flag F_THIDLMG is 1. In the case that the result of the determination is NO (fully closed), the flow proceeds to step S061, and in the case that the result of the determination is YES (not fully closed), the flow proceeds to step S054A.

In step S054A, the engine rotation speed increase flag F_NERGNUP during half-engaged clutch determination is set to 0, and the flow proceeds to step S055. Moreover, the engine rotation speed increase flag F_NERGNUP during half-engaged clutch determination will be explained below.

In step S055, it is determined whether or not the electric motor assist determination flag F_MAST is 1. This flag is a flag that determines whether or not the engine should be assisted by the electric motor M. The case that it is 1 means that assistance is required, and the case that it is 0 means that assistance is not required. Moreover, the assist trigger determination processing sets this electric motor assist determination flag.

When the determination in step S055 is "NO", the flow proceeds to step S061. In the case that the result of the determination in step S055 is YES, the flow proceeds to step S056.

In step S061, it is determined whether or not the MT/CVT determination flag F_AT is 1. In the case that the result of the determination is NO (MT vehicle), the flow proceeds to step S063. In the case that the result of the determination is YES (CVT vehicle), the flow proceeds to step S062.

In step S062, it is determined whether or not the reverse position determination flag F_ATPR is 1. In the case that the result of the determination is YES (reverse position), the flow proceeds to step S085, and in the case that the result of the determination is NO (other than reverse position), the flow proceeds to step S063.

In step S056, it is determined whether or not the MT/CVT determination flag F_AT is 1. In the case that the result of the determination is YES (CVT vehicle), the flow proceeds to step S057, and in the case that the result of the determination is NO (MT vehicle) the flow proceeds to step S067A.

In step S057, it is determined whether or not the break ON determination flag F_BKSW is 1. In the case that the result of the determination is YES (break ON), the flow proceeds to step S063, and in the case that the result of the determination is NO (break OFF), the flow proceeds to step S057A.

In step S063, it is determined whether or not the vehicle speed VP is 0. In the case that the result of the determination is YES, the flow proceeds to step S083, and in the case that the result of the determination is NO, the flow proceeds to step S064.

In step S064, it is determined whether or not the engine stop control execute flag F_FCMG is 1. In the case that the result of the determination is NO, the flow proceed to step S065, and in the case that the result of the determination is YES, the flow proceeds to step S084.

In step S065, it is determined whether or not the shift change DNE forced REGEN release determination processing delay timer TNERGN is 0. In the case that the result of the determination is YES, the flow proceeds to step S066, and in the case that the result of the determination is NO, the flow proceeds to step S068.

In step S066, it is determined whether of not the rate of change of the engine revulsions is smaller than the negative value of the no REGEN determination engine rotation speed #DNRGNCUT by DNE. Here, the no REGEN determination engine rotation speed #DNRGNCUT by DNE is the rate of change DNE of the engine rotation speed NE that serves as the standard of determining whether or not to carry out a decrease of the amount of electrical generation that depends on the rate of change DNE of the engine rotation speed.

In the case that the result of the determination in step S066 is that the decrease (decreasing rate) of the engine rotation speed NE is large (YES), the flow proceeds to step S082. In step S082, the engine rotation speed increase flag F_NERGNUP during half-engaged clutch determination is set to 1, and the flow proceeds to step S085.

Here, the reason for providing the engine rotation speed increase flag F_NERGNUP during half-engaged clutch determination is as follows. Each time the engine rotation speed NE change during a half-engaged clutch, the determination in step S070 described below prevents frequent switch hunting, and thereby during the half-engaged clutch, the engine rotation speed during half-engaged clutch determination is increased. In order to clarify this, the engine rotation speed increase flag F_NERGNUP during half-engaged clutch is set.

In the case that the result of the determination in step S066 is that the engine rotation speed increases and the decrease (rate of decrease) of the engine rotation speed NE is small (NO), the flow proceeds to step S067.

In step S067, it is determined whether or not the MT/CVT determination flag F_AT is 1. In the case that the result of the determination is NO (MT vehicle), the flow proceeds to step S079, and in the case that the result of the determination is YES (CVT vehicle), the flow proceeds to step S068.

In step S079, it is determined whether or not the half-engaged clutch determination flag F_NGRHCL is 1. In the case that the result of the determination is YES, the flow proceeds to step S082. In addition, in the case that the half-engaged clutch determination is not made (NO), the flow proceeds to step S080.

In step S080, the previous gear position NGR and the current gear position NGR1 are compared, and it is determined whether or not the gear has been shifted up by comparing the current and previous gear positions.

In the case that the result of the determination in step S080 is that the gear position has been shifted up (NO), the flow proceeds to step S082. In the case that the result of the determination in step S080 is that the gear position has not been shifted up between the current and previous gear positions (YES), the flow proceeds to step S068. In this manner, in the case of a half-engaged clutch, the processing moves to step S082, and the reason for subsequently moving to the idle mode is that when regeneration occurs in the half-engaged clutch state, there is the possibility that the engine will stall. In addition, in the case that gears have been shifted up, the flow moves to step S082, and the reason for subsequently moving to idle mode is that when regeneration occurs during a decrease in the engine rotation speed due to shifting the gear up, there is the possibility that the engine will stall.

In step S068, it is determined whether or not the engine rotation speed increase flag F_NERGNUP during half engaged clutch determination is 1. In the case that the result of the determination is that an increase in engine rotation speed during the half-engaged clutch determination is necessary and the flag is set (=1) (YES), the flow moves to step S081, and the increase rotation speeds #DNERGNUP for preventing hunting is added to the electrical charge engine rotation speed lower limit value #NERGNLx that is set for each gear, this added value is set to the charge engine rotation speed lower limit value NERGNL, and the flow proceeds to step S070. In the case that the result of the determination in step S068 is that an increase in the engine rotation speed during half-engaged clutch determination is unnecessary and the flag is reset (=0) (NO), the flow proceeds to step S069, and the electrical charge engine rotation speed lower value #NERGNLx set for each gear is set to the electrical charge engine rotation speed lower limit NERGNL, and the flow moves to step S070.

In addition, in step S070, it is determined whether or not the engine rotation speed NE is equal to or less than the electrical charge engine rotation speed lower limit NERGNL. In the case that the result of the determination indicates that the number of rotation speeds are low (NE≦NERGNL, YES), the flow proceeds to step S082. In the case that the result of the determination indicates that the number of rotation speeds is high (NE>NERGNL, NO), the flow proceeds to step S071.

In step S057A, it is determined whether or not the scramble assist demand flag F_MASTSCR is 1. This scramble assist is for increasing the sense of acceleration by increasing the amount of the assist temporarily during acceleration. Basically, when the amount of change in the throttle is large, the scramble assist demand flag F_MASTSCR is set to 1.

In the case that the result of the determination in step S057A is NO, in step S057B, REGENF processing during acceleration is carried out, and the flow proceeds to step S057D. In addition, in the case that the result of the determination in step S057A is YES, in step S057C decrement processing of the final electrical charge command value REGENF is carried out, and the flow proceeds to step S058.

In step S057D, it is determined whether or not the REGEN processing flag F_ACCRGN during acceleration is 1. In the case that the result of the determination is YES (processing is being carried out), the flow proceeds to step S058, and in the case that the result of the determination is NO (processing is not being carried out), the flow proceeds to step S057C.

In step S058, it is determined whether or not the final electric charge command value REGENF is equal to or lower than 0. In the case that the result of the determination is YES, the flow proceeds to the "accelerating mode" in step S059. In the accelerating mode, the engine E is provided with drive assistance by the electric motor M, and the flow proceeds to step S058A. In the case that the result of the determination in step S058 is NO, the control ends.

In step S059A, it is determined whether or not the assist permission flag F_ACCAST is 1. In the case that the result of the determination is YES, the control ends, and in the case that the result of the determination is NO, the flow proceeds to step S 059B.

In step S059B, it is determined whether or not the propulsion assist permission flag F_STRAST is 1. In the case that the result of the determination is YES, the control ends, and in the case that the result of the determination is NO, the flow proceeds to step S059.

In step S059C, it is determined whether or not the scramble assist permission flat F_SCRAST is 1. In the case that the determination is YES, the control ends, and in the case that the result of the determination is NO, the flow proceeds to step S059D.

In step S059D, it is determined whether or not the cylinder deactivation reactivating assist permission flag F_RCSAST is 1. In the case that the result of the determination is YES, the control ends, and in the case that the result of the determination is NO, the flow proceeds to step S063. Here, the case that the cylinder deactivation reactivating assist permission flag F_RCSAST is 1 means that drive assistance by the electric motor is permitted when moving from all cylinders deactivated driving to all cylinders activated (normal) driving, which will be explained below.

In step S071, it is determined whether or not the vehicle speed VP is equal to or less than the deceleration mode brake determination lower limit vehicle speed #VRGNBK. Moreover, the deceleration mode brake determination lower limit vehicle speed # VRGNBK is a value that has hysteresis. In the case that the result of the determination is that the vehicle speed is less than or equal to the deceleration mode brake determination lower limit vehicle speed #VRGNBK (YES), the flow proceeds to step S074. In the case that the result of the determination in step S071 is that the vehicle speed is greater than the deceleration mode brake determination lower limit vehicle speed #VRGNBK (NO), the flow proceeds to step S072.

In step S072, it is determined whether or not the brake ON determination flag F_BKSW is 1. In the case that the result of the determination is YES, the flow proceeds to step S0732, and in the case that the result of the determination is NO, the flow proceeds to step S074.

In step S073, it is determined whether or not the IDLS determination flag F_THIDLMG is 1. In the case that the result of the determination is NO (throttle is completely closed), the flow proceeds to the "deceleration mode" of step S078, and the control ends by carrying out the REGEN processing during acceleration in step S077A. Moreover, in the deceleration mode, regenerative breaking is carried out by the electric motor M, but because all cylinders are deactivated in this deceleration mode, the amount of regeneration by the electric motor M can be increased by an amount equivalent to the decrease of the friction of the engine. In the case that the result of the determination in step S073 is YES (throttle is not completely closed), the flow proceeds to step S074.

In step S074, it is determined whether or not the fuel cut flag F_FC is 1. This flag is the fuel cut determination flat that takes the value 1 while regeneration is being carried out by the electric motor M in the "deceleration mode" of step S078, and cuts off the fuel. In the case that the result of the determination in step S074 is that a deceleration fuel cut is in progress (YES), the flow proceeds to step S078. In the case that the result of the determination in step S074 is that a fuel cut is not in progress (NO), the flow proceeds to step S075, the decrement processing of the final assist command value ASTPWRF is carried out, and the flow proceeds to step S076.

In step S076, it is determined whether or not the final assist command value ASTPWRF is equal to or less than 0. In the case that the result of the determination is YES, the flow moves to "cruise mode" of step S077, and then the control is ended after carrying out the REGEN processing during acceleration in step S077A. In cruise mode, the electric motor is not driven and the vehicle travels under the drive power of the engine E. In addition, depending on the operating state of the vehicle, there are cases when the electric motor carries out regenerative breaking and is used as a generator to charge the battery 3.

In the case that the result of the determination in step S076 is NO, the control is completed.

"All cylinders deactivation driving switching execution processing"

Next, the all cylinders deactivation driving switching execution processing will be explained based on FIG. 6.

Here, all cylinders deactivation driving means driving in which, under constant conditions, during deceleration regeneration, the intake valves and exhaust valves are closed by a variable valve timing mechanism VT, and is carried out in order to decrease the engine friction and increase the amount of the deceleration regeneration. In the flowchart explained below, the setting and resetting of the flag (all cylinders deactivation execution flag F_ALCS) for switching between this all cylinders deactivated driving and normal driving in which all cylinders deactivation is not carried out is carried out at a predetermined periodicity. This all cylinders deactivation execution flag F_ALCS forms the cylinder deactivation discriminating device.

In step S101, it is determined whether or not the indicated F/S (failsafe) detection has completed. In the case that the result of the determination is NO, the flow proceeds to step S102, and in the case that the result of the determination is YES, the flow proceeds to step S114. This is because in the case that there is any sort of abnormality, all cylinders deactivation should not be carried out.

In step S102, it is determined whether or not all cylinders deactivated driving is in progress by whether or not the all cylinders deactivation execution flag F_FALCS is 1. This all cylinders deactivation execution flag F_ALCS is a flag set by this flowchart, and in the case that the flag value is 1, the all cylinders deactivation driving is executed, and in the case that it is 0, all cylinders deactivated driving is not carried out, and normal driving is carried out.

In the case that the result of the determination in step S102 is YES and all cylinders deactivated execution is in progress, the flow proceeds to step S105. Therefore, when all cylinders deactivated execution (F_ALCS=1) is in progress as a result of an all cylinders deactivated execution preconditions determination, an all cylinders deactivated preconditions determination is not made. In the case that the result of the determination in step S102 is NO and all cylinders deactivated execution is not in progress, in step S103 the all cylinders deactivated execution precondition determination (F_ALCSSTB_JUD) is carried out and the flow proceeds to step S104. To the extent that it is the case that the preconditions are satisfied due to this all cylinders deactivated execution precondition determination, all cylinders deactivated diving is executed.

In step S104, it is determined whether or not the all cylinders deactivated standby flag F_ALCSSTB is 1. This flag takes the flag value 1 when the preconditions are satisfied by the determination in step S103, and when they are not satisfied, takes the value 0. By this flag, it is determined whether or not the cylinder deactivation can be executed depending on the operating state of the vehicle. In the case that the results of the determination in step S104 is YES, the preconditions are satisfied, and thus the flow proceeds to step S105. In the case that the result of the determination in step S 104 is NO, the preconditions are not satisfied, and thus the flow proceeds to step S114.

In step S105, the all cylinders deactivated release condition determination (F_ALCSSTP_JUD) to be described below is carried out, the flow proceeds to step S106. In the case that the release conditions are satisfied by the all cylinders deactivated release condition determination, all cylinders deactivated operation is not executed. This all cylinders deactivated release condition determination is different from the all cylinders deactivated precondition determination, and is always carried out in the case that the processing in FIG. 6 is carried out.

In step S106, it is determined whether or not the all cylinders deactivated release condition satisfied flag F_ALCSSTP is 1. This flag is a flag that takes a flag value of 1 when the release conditions are satisfied by the determination in step S105, and takes the flag value 0 when they are not satisfied. By this flag, it is determined whether or not the release of the cylinder deactivation is possible or not depending on the operating condition of the vehicle while the cylinders of the engine are deactivated. In the case that the result of the determination in step S106 is YES, the release conditions are satisfied, and thus the flow advances to step S114. In the case that the result of the determination in step S106 is NO, the release conditions are not satisfied, and thus the flow proceeds to step S107.

In step S107, a predetermined value #TMALCS2 is set to the solenoid OFF delay timer TALCSDLY2 for the spool valve SV described above, and the flow proceeds to step S108. This is because in the case that operation moves from all cylinders deactivated operation to normal operation, a constant time interval is guaranteed from the completion of the determination in step S105 to the completion of the OFF operation of the solenoid of the spool valve SV of step S116, which will be described below.

In step S108, it is determined whether or not the solenoid ON delay timer TALCSDLY1 described below is 0. In the case that the result of the determination is YES, a constant time interval has passed, and thus the flow proceeds to step S109. In the case that the result of the determination is NO, a constant time interval has not passed, and the flow proceeds to step S116.

In step S109, the all cylinders deactivation for the solenoid flag F_ALCSSOL is set to 1 (the all cylinders deactivated solenoid of the spool valve is ON), and the flow proceeds to step S110.

In step S110, it is determined by an oil pressure sensor whether or not the oil pressure is actually generated by the ON operation of the solenoid for all cylinders deactivation. Concretely, it is determined whether or not the engine oil pressure POIL is equal to or greater than the all cylinders deactivation operation execution determination oil pressure #POILSCH (for example, 137 k PA (=1.4 kg/cm²). In the case that the result of the determination is YES and it is on the high pressure side, the flow proceeds to step S111. In the case that the result of the determination is NO (there is hysteresis), the flow proceeds to step S118. Here, instead of an oil pressure sensor, it can be determined by using an oil pressure switch.

In step S111, it is determined whether or not the all cylinders deactivated operation executing delay timer CSDLY1 is 0 in order to guarantee the time interval from that the spool valve is ON until the oil has pressure applied. In the case that the result of the determination is YES, the flow proceeds to S112. In the case that the result of the determination is NO, the flow proceeds to step S120.

In step S112, the timer value #TMOCSDL2, which depends on the oil temperature TOIL measured by the oil temperature sensor, is searched for in a table, and the all cylinders deactivation operation release delay timer CSDLY2 is set thereto. When the temperature is low, the rise in the oil pressure is slow, and the oil pressure influences the operation delay. Thus, the timer value #TMOCSDL2 is a value that becomes larger as the oil temperature TOIL becomes lower.

In addition, in step S113, the all cylinders deactivated execution flag F_ALCS is set to 1, and the control is completed. Moreover, in step S112, instead of oil temperature, a timer value can also be found based on the engine water temperature.

In step S114, the solenoid ON delay timer TALCSDLY1 is set to the predetermined value #TMALSC1, and the flow proceeds to step S115. This is so that in the case that the operation moves from normal operation to all cylinders deactivated operation, a constant time interval is guaranteed from the completion of the determination in step S105 to the ON operation of the solenoid of the spool valve of step S109.

In step S115, it is determined whether or not the solenoid OFF delay timer TALCSDLY2 is 0. In the case that the result of the determination is YES, a constant time interval has passed, and thus the flow proceeds to step S116. In the case that the result of the determination in step S115 is NO, a constant time interval has not passed, and thus the flow proceeds to step S109.

In step S116, the all cylinders deactivated solenoid flag F_ALCSSOL is set to 0 (set the solenoid of the spool valve for all cylinders deactivated to OFF), and the flow proceeds to step S117.

In step S117, the oil pressure sensor determines whether or not the oil pressure is actually released due to the OFF operation of the solenoid for the all cylinders deactivated release. Concretely, it is determined whether or not the oil pressure POIL is equal to or less than the all cylinders deactivated operation release determination oil pressure #POILCSL (for example, 98 kPa (=1.0 kg/cm²)). In the case that the result of the determination is YES and there is low pressure, the flow proceeds to step S118. In the case that the result of the determination is NO (there is hysteresis), the flow proceeds to step S111. In this case as well, instead of an oil pressure sensor, an oil pressure switch can be used.

In step S118, it is determined whether or not the all cylinders deactivated operation release delay timer TCSDLY2 is 0 in order to guarantee a time interval from the spool valve being turned OFF to the release of the oil pressure. In the case that the result of the determination is YES, the flow proceeds to step S119. In the case that the result of the determination is NO, the flow proceeds to step S113.

In step S119, the timer value #TMOCSDL1, which depends on the oil temperature TOIL measured by the oil temperature sensor, is found in a table, and the all cylinder deactivation operation execution delay timer TCSDLY1 is set thereto. This is because when the oil temperature is low, the oil temperature can influence the operation delay since the increase in the oil pressure is delayed. Thus, the lower the oil temperature TOIL, the higher the value of the timer value #TMOCSDL1.

In addition, in step A 120, the all cylinders deactivated execution flag F_ALCS is set to 0, and the control is ended. Moreover, in step S119, instead of oil temperature, the timer value can be found based on the engine water temperature.

All Cylinder Deactivated Preconditions Execution Determination Processing

Next, based on FIG. 7, the all cylinder deactivated preconditions execution determination processing in step S103 in FIG. 6 will be explained.

In step S131, it is determined whether or not the intake pipe negative pressure PBGA relative to the atmospheric pressure is equal to or greater than the all cylinders deactivated execution maximum negative pressure #PBGALCS (for example, −40 kPa (=−300 mmHg)). The all cylinders deactivation should not be carried out in the case that the load on the engine is large. In the case that the result of the determination in step S131 is YES (low load), the flow proceeds to step S132, and in the case that the result of the determination is NO, the flow proceeds to step S138.

In step 138, the all cylinder deactivation standby flag F_ALCSSTB is set to 0 because the all cylinder deactivation preconditions are not satisfied, and the control ends.

In step S132, it is determined whether or not the external air temperature TA is within a predetermined range (the all cylinders deactivated execution minimum external air temperature #TAALCSL (for example, 0°)≦TA≦ all cylinders deactivated execution maximum external air temperature #TAALCSH (for example, 50° C.)). In the case that the result of the determination in step S132 is that the external air temperature TA is within a predetermined range, the flow proceeds to step S133. In the case that the result of the determination in step S133 is that the external air temperature TA is not within a predetermined range, the flow proceeds to step S138. This is because the engine would become unstable if all cylinder deactivation is carried out in the cases that the external air temperature TA falls below the all cylinder deactivate execution minimum external air temperature #TAALCSL or rises above the all cylinder deactivation execution maximum external air temperature #TAALCSH.

In step S133, it is determined whether or not the cooling water temperature TW is within a predetermined range (all cylinders deactivated execution minimum cooling water temperature #TWALCSL (for example, 70° C.)≦TW≦ all cylinders deactivated execution maximum cooling water temperature #TWALCSH (for example, 100° C.)). In the case that the result of the determination in step S133 is that the cooling water temperature TW is within a predetermined range, the flow proceeds to step S134. In the case that it is not within the predetermined range, the flow proceeds to step S138. This is because the engine would become unstable if all cylinder deactivation is carried out in the cases that the cooling water temperature TW falls below the all cylinder deactivate execution minimum cooling water temperature #TWALCSL or rises above the all cylinder deactivation execution maximum cooling water temperature #TWALCSH.

In step S134, it is determined whether or not the atmospheric pressure PA is equal to or greater than the all cylinder deactivation execution maximum atmospheric pressure #PAALCS (for example, 77.3 kPa (=580 mmHg)). In the case that the result of the determination in step S 134 is YES (high pressure), the flow proceeds to step S135, and in the case that the result of the determination is NO, the flow proceeds to step S138. This is because in the case that the atmospheric pressure is low, all cylinder deactivation should not be carried out. (For example, it cannot be guaranteed that the master power negative pressure of the break is in a sufficient state during the braking operation.)

In step S135, it is determined whether or not the voltage of the 12V auxiliary battery 4 (the drive source voltage) is equal to or greater than the all cylinder deactivation execution maximum voltage #VBALCS (for example, 10.5 V). In the case that the result of the determination is YES (high voltage), the flow proceeds to step S136, and in the case that the result of the determination is NO, the flow proceeds to step S138. This is because in the case that the voltage VE of the 12 V battery is lower than a predetermined value, the responsiveness of the spool valve SV deteriorates. This is a measure taken during a lowering of the temperature of the battery in a low temperature environment and during battery deterioration.

In step S136, it is determined whether or not the oil temperature TOIL is within a predetermined range (for example, 70°)≦TOIL≦ all cylinders deactivated execution maximum oil temperature #TOALCSH (for example, 100° C.)). In the case that the result of the determination in step S136 is that the oil temperature TOIL is within a predetermined range, the flow proceeds to step S137. In the case that it is not within the predetermined range, the flow proceeds to step S138. This is because the responsiveness of the switching is not stable during the engine operation and during all cylinder deactivation if all cylinder deactivation is carried out in the cases that the oil temperature TOIL falls below the all cylinder deactivate execution minimum oil temperature #TOALCSL or rises above the all cylinder deactivation execution maximum oil temperature #TOALCSH.

In step S137, because the all cylinder deactivation preconditions are satisfied, the all cylinder deactivation standby flag F_ALCSSTB is set to 1, and the control ends.

"All cylinder deactivated release condition determination processing"

Next, based on FIG. 8, the all cylinders deactivated release condition determination processing will be explained. Moreover, the process is repeated at predetermined cycles.

In step S141, it is determined whether or not the fuel cut flag F_FC is 1. In the case that the result of the determination in step S141 is YES, the flow proceeds to step S142, and in the case that the result of the determination is NO, the flow proceeds to step S157. The object of this determination is to decrease the friction of the engine during a deceleration fuel cut and to increase the amount of regeneration by an amount equivalent to this decrease.

In step S157, because the all cylinders deactivated release condition is satisfied, the all cylinders deactivated release condition satisfied flag F_ALCSSTP is set to 1, and the control is ended.

In step S142, it is determined whether or not regenerative breaking is in progress. In the case that the result of the determination in step S141 is YES, the flow proceeds to step S143, and in the case that the result of the determination is NO, the flow proceeds to step S157.

In step S143, it is determined whether or not the MT/CVT determination flag F_AT is 1. In the case that the result of the determination is NO (MT vehicle), the flow proceeds to step S144. In the case that the result of the determination is YES (AT/CVT vehicle), the flow proceeds to step S155.

In step S155, it is determined whether or not the in-gear determination flag F_ATNP is 1. In the case that the result of the determination is NO (in-gear), the flow proceeds to step S156. In the case that the result of the determination is YES (N/P range), the flow proceeds to step S157.

In step S156, it is determined whether or not the reverse position determination flag F_ATPR is 1. In the case that the result of the determination is YES (reverse position), the flow proceeds to step S157. In the case that the result of the determination is NO (other than reverse position), the flow proceeds to step S146.

The all cylinders deactivation in the N/P range and the reverse position is released by the processing in the step S155 and step S156.

In step S144, it is determined whether or not the previous gear position NGR is a higher gear than the all cylinders deactivated continuation minimum gear position #NGRALCS (for example, third gear is included in this position). In the case that the result of the determination is YES (high gear side), the flow proceeds to step S145, and in the case that the result of the determination is NO (low gear side), the flow proceeds to step S157. This is in order to prevent a deterioration in the regeneration rate in low gear and the occurrence of frequent switching to cylinder deactivation in crowded traffic conditions or the like.

In step S145, it is determined whether or not the half-engaged clutch determination flag F_NGRHCL is 1 (half-engaged clutch). In the case that the result of the determination is YES (half-engaged clutch), the flow proceeds to step S157, and in the case that the result of the determination is NO, the flow proceeds to step S156. Thereby, for example, unnecessary cylinder deactivation can be prevented so that inconveniences such as engine stall in the case of moving into half-engaged clutch in order to stop the vehicle, or not being able to respond to the demands of the driver in the case of moving to a half-engaged clutch state in order to make a gear change during acceleration.

In step S146, it is determined whether or not the rate of change DNE of the engine rotation speed is equal to or less than the negative value (for example, −10 rpm) of the all cylinders deactivated continuation execution maximum engine rotation speed change rate #DNEALCS. In the case that the result of the determination is YES (the rate of lowering of the engine rotation speed is high), the flow proceeds to step S157, and in the case that the result of the determination is NO, the flow proceeds to step S148. This is in order to prevent engine stall in the case that all cylinder deactivation is carried out when the rate of lowering of the engine rotation speed is large.

In step S148, it is determined whether or not the vehicle speed VP is within a predetermined range (for example, 10 km/h)≦VP≦ all cylinders deactivated continuation execution maximum vehicle speed #VPALCSH (for example, 60 km/h)). In the case that the result of the determination in step S148 is that the vehicle speed VP is within the predetermined range, the flow proceeds to step S149. In the case that the vehicle speed VP is not within the predetermined range, the flow proceeds to step S157. The all cylinders deactivation is released in the case that the vehicle speed VP falls below the all cylinders deactivated continuation execution minimum vehicle speed #VPALCSL, or rises above the all cylinder deactivation continuation exaction maximum vehicle speed #VPALSCH.

In step S149, it is determined whether or not the engine rotation speed NE are within a predetermined range (for example, 800 rpm)≦NE≦ all cylinders deactivated continuation execution maximum engine rotation speed #NALCSH (for example 3,000 RPM)). In the case that the result of the determination in step S149 is that the engine rotation speed NE is within the predetermined range, the flow proceeds to step S150. In the case that the engine rotation speed NE is not within the predetermined range, the flow proceeds to step S157. The all cylinders deactivation is released in the case that the engine rotation speed falls below the all cylinders deactivation continuation execution minimum engine rotation speed #NALCSL or rises above the all cylinders deactivated continuation execution maximum engine rotation speed #NALCSH. There is the possibility that when the engine rotation speed NE is low that the regeneration efficiency will deteriorate and that the switching oil pressure for the all cylinder deactivation cannot be guaranteed. In addition, when the engine rotation speed NE is too high, there is the possibility that due to high rotation speeds the oil pressure will become too high and the switching of the cylinder deactivation becomes impossible, and in addition, there is the possibility of a deterioration in the consumption of the working oil for the cylinder deactivation.

In step S150, it is determined whether or not the negative pressure in the brake master power MPGA is equal to or greater than the all cylinders deactivated execution implementation continuation execution maximum negative pressure #ftMPALCS (for example, −26.7 kPa (=−200 mmHg)). In the case that the result of the determination is that the negative pressure in the brake master power MPGA relative to the atmosphere pressure is equal to or greater than the all cylinders deactivated execution implementation continuation execution maximum negative pressure #MPALCS (MPGA≦#MPACLS, YES), the flow proceeds to step S151. In the case that the result of the determination is that the negative pressure in the brake master power MPGA relative to the atmosphere pressure is smaller than the all cylinders deactivated execution implementation continuation execution maximum negative pressure #MPALCS (MPGA≦#MPFCMG, NO), the flow proceeds to step S157. This is because the all cylinder deactivation should not be continued in the case that the negative pressure in the break master power is insufficient.

In step S151, it is determined whether or not the remaining battery capacity QBAT is within a predetermined range (all cylinders deactivated continuation execution minimum remaining charge #QBALCSL (for example, 30%) ≦QBAT≦ all cylinders deactivated continuation execution maximum remaining charge #QBALCSH (for example, 80%). In the case that the result of the determination in step S151 is that the remaining battery capacity QBAT is determined to be within the predetermined range, the flow proceeds to step S152. In the case that the remaining battery capacity QBA is not in the predetermined range, the flow proceeds to step S157. The all cylinders deactivation is released in the cases that the remaining battery capacity QBA falls below the all cylinders deactivated continuation execution minimum remaining charge #QBALCSL, or rises above the all cylinders deactivated continuation execution maximum remaining charge #QBALCSH. When the remaining battery capacity QBAT is too small, the energy for engine drive assistance by the electric motor M carried out when reverting from all cylinders deactivated cannot be guaranteed. In addition, when the remaining battery capacity QBAT is too high, regeneration cannot occur.

In step S152, it is determined whether or not the IDLE determination flag F_THIDLMG is 1. In the case that the result of the determination is YES (not all cylinders closed), the flow proceeds to step S157, and in the case that the result of the determination is NO (all cylinders closed), the flow proceeds to step S153. In the case that the throttle is even slightly opened from the completely closed state, the continuation of the all cylinders deactivated is released, and the product becomes more saleable.

In step S153, it is determined whether or not the engine oil pressure POIL is equal to or above the all cylinders deactivated continuation execution minimum oil pressure #POALCS (for example, 98–137 kPk (1.0–1.4 kg/cm² with hysteresis)). In the case that the result of the determination is YES, the flow proceeds to step S154, and in the case that the result of the determination is NO, the flow proceeds to step S157. This is because in the case that the engine oil pressure POIL is lower than the all cylinders deactivated continuation execution minimum oil pressure #POALCS, the oil pressure for implementing the cylinder deactivation (for example, an oil pressure that activates the spool valve SV) cannot be guaranteed.

In step S154, because the conditions of the all cylinders deactivated release are not satisfied, the all cylinders deactivated is continued, and thus the all cylinders deactivated release condition satisfaction flag F_ALCSSTP is set to 0, and the control ends.

Fuel Cut Execution Determination Processing

Next, the fuel cut execution determination processing will be explained referring to FIG. 9. Moreover, this processing is repeated at a predetermined cycle.

Normally, having as objects engine protection and improvement of fuel efficiency, in the case that constant conditions are satisfied, a fuel cut is carried out, However, in the determination processing of whether or not to carry out this fuel cut, conditions related to all cylinders deactivation are added.

In step S201, the high rotation speed fuel cut execution determination processing is carried out, and the flow proceeds to step S202. This is a fuel cut carried out for engine protection in the case that the engine is rotating at high speed (for example, the engine rotation speed NE is equal to or greater than 620 rpm), and in this processing, setting and resetting of the high rotation fuel cut flag F_HNFC are carried out.

In step S202, it is determined whether or not the high rotation speed fuel cut flag F_HNFC is 1. In the case that the result of the determination is YES (high rotation speed fuel cut satisfied), the flow proceeds to step S212, and in the case that the result of the determination is NO, the flow proceeds to step S203.

In step S212, (the fuel supply stop device), the fuel cut flag F_FC is set to 1, and the control ends. Moreover, in the case that the fuel cut flag F_FC is 1, fuel injection is not carried out.

In step S203, high velocity fuel cut execution determination processing is carried out, and the flow proceeds to step S204. This is a fuel cut that is carried out from the view of velocity restriction in the case that the vehicle Is traveling at a high velocity (for example, 180 km/h or greater), and in this processing, the setting and resetting of the high vehicle speed fuel cut flag F_HVFC are carried out.

In step S204, it is determined whether or not the high vehicle speed fuel cut flag F_HVFC is 1. In the case that the result of the determination is 1 (high vehicle speed fuel cut satisfied), the flow proceeds to step S212, and in the case that the result of the determination is NO, the flow proceeds to step S205.

In step S205, deceleration fuel cut execute determination processing is carried out, and the flow proceeds to step S206. This is a fuel cut carried out in order to improve fuel efficiency in the case that the vehicle is decelerating, and in this processing, the setting and resetting of the deceleration fuel cut flag F_FC are carried out.

In step S206, it is determined whether or not the fuel cut flag F_FC is 1. In the case that the result of the determination is YES, the flow proceeds to step S212, and in the case that the result of the determination is NO, the flow proceeds to step S207. Moreover, in the case that the deceleration mode is entered and the fuel cut flag F_FC becomes 1, the fuel cut is carried out.

In step S207, it is determined whether or not the all cylinders deactivation execution flag F_ALCS is 1. In the case that the result of the determination is YES (all cylinders deactivation in progress), the flow proceeds to step S212, and in the case that the result of the determination is NO, the flow proceeds to step S208.

In step S208, it is determined whether or not the all cylinders deactivated solenoid flag F_FALCSSOL is 1. In the case that the result of the determination is YES (the all cylinder deactivation solenoid is ON), the flow proceeds to step S212, and in the case that the result of the determination is NO, the flow proceeds to step S209.

Therefore, in the case that the all cylinders deactivated operation (F_ALCS=1) is in progress, and the intake valve and the exhaust valve are closed (step S207), and in the case that the all cylinders deactivated solenoid flag F_ALCSSOL is 1 (step S208), the fuel cut is continued.

In addition, in the case of a reactivation from the all cylinders deactivated operation to the normal operation, even if the all cylinders deactivation execution flag F_ALCS becomes 0 the all cylinders deactivated solenoid flag F_ALCSSOL is 0. Specifically, from the time that the all cylinders deactivated solenoid is OFF until they are all completely reactivated, cylinders may be deactivated, and thus the determination according to the all cylinders deactivated solenoid flag F_ALCSSOL in step S208 is added, and in the case that the all cylinders solenoid flag F_ALCSSOL becomes 0, the fuel cut is released (F_FC= 0).

In step S209, the fuel cut flag F_FC is set to 0, the fuel cut is released, and the control ends.

Deceleration Mode

Figure 10:
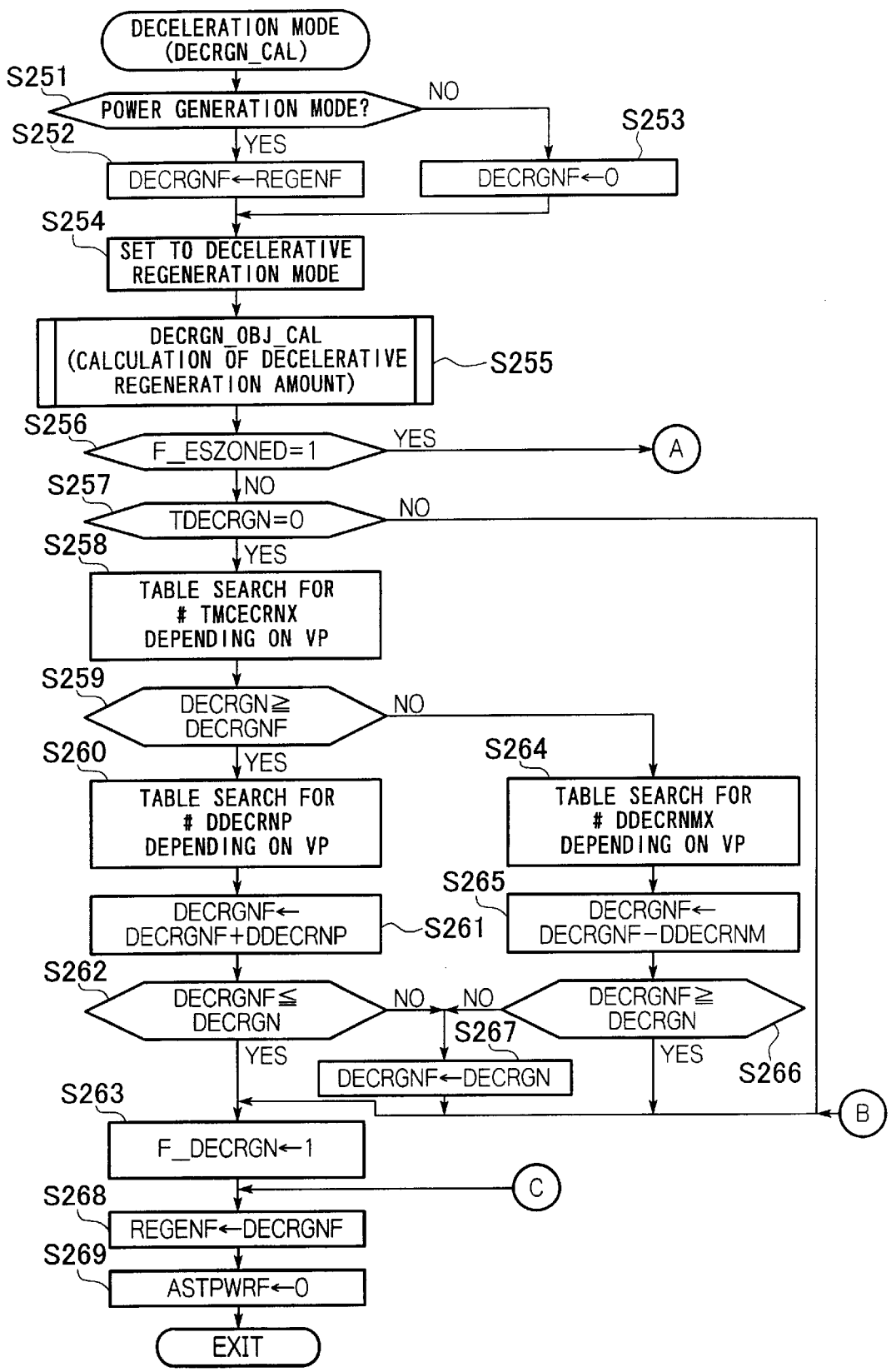
FIG. 10 is a flowchart of the deceleration mode of the embodiment.
Figure 11:
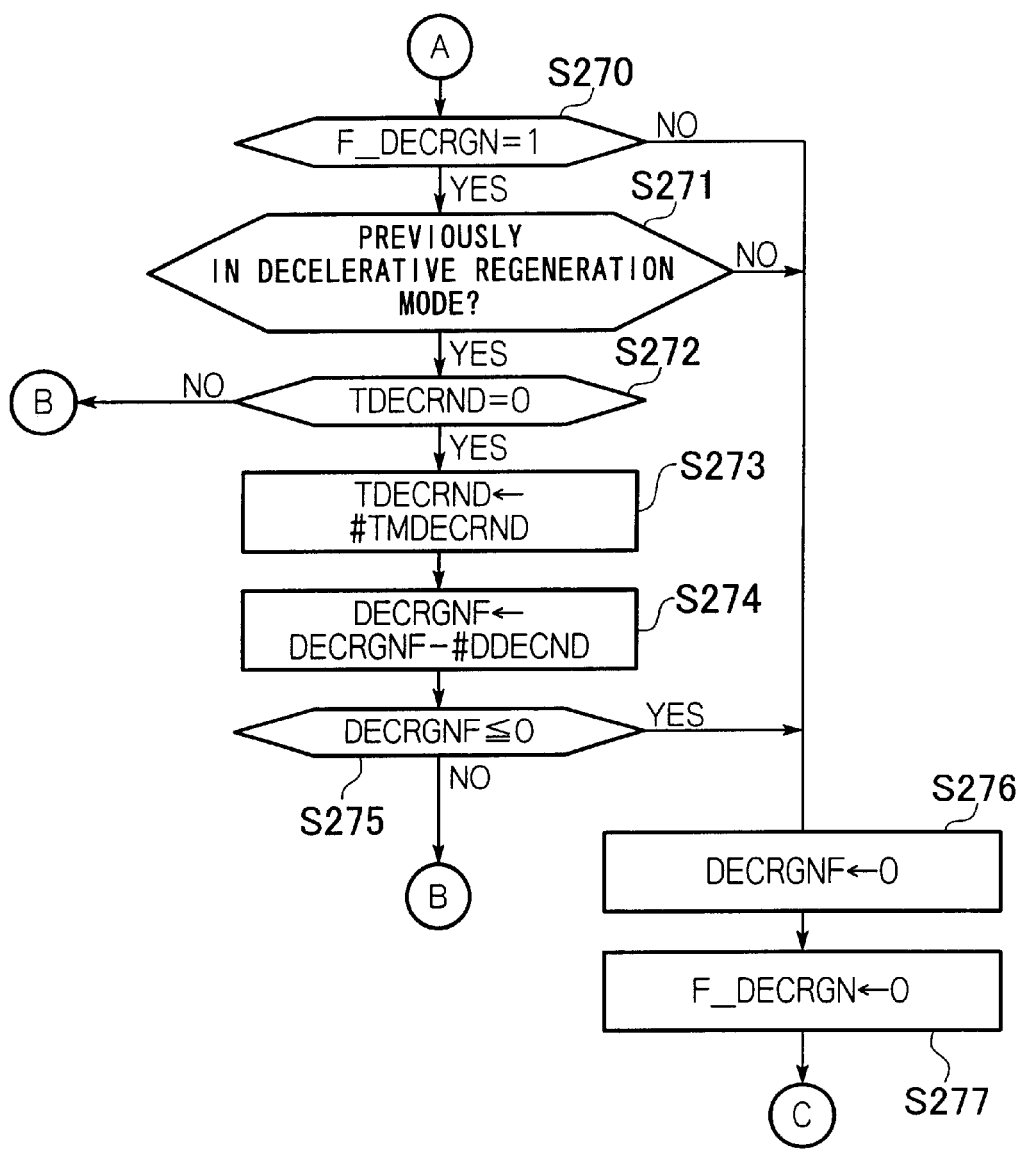
FIG. 11 is a flowchart of the deceleration mode of the embodiment.

Next, the deceleration mode will be explained while referring to FIG. 10 and FIG. 11. In this mode, in comparison to conventional vehicles that are not provided with an all cylinders deactivated function, the amount of regeneration is increased (this will be explained below in step S255). Specifically, the engine friction is decreased by carrying out the all cylinders deactivation, and an amount of regeneration equivalent to that amount can be guaranteed. Thus, compared to a conventional vehicle, the amount of regeneration can be set to large. Thus, because the frequency of the drive assistance and the drive assistance amount for the engine E can be increased by the electric motor M by an amount equivalent to this increase in regeneration, the fuel efficiency can be improved. Moreover, when the engine friction is reduced as a result of the all cylinders deactivation, the feeling of deceleration is small, but because the amount of regeneration is set larger by an amount equivalent to this, the feeling of deceleration felt by the driver does not change, and there is no sense of discomfort imparted to the driver. Moreover, this processing is repeated at a predetermined cycle.

In step S251, it is determined whether or not the vehicle is in the electric power generation mode. In the case that the result of the determination is YES, the flow proceeds to step S252, and in the case that the result of the determination is NO, the flow proceeds to step S253.

In step S252, the final power generation command value REGENF is substituted for the deceleration regeneration final operation value DECRGNF, and the flow proceeds to step S254. In step S253, the deceleration regeneration final operation value DECRGNF is set to 0, and the flow proceeds to step S254. In step S254, the vehicle is set to the regenerative breaking mode, and the flow proceeds to step S255.

In step S255 (the regeneration amount calculation device), the calculation of the target regeneration amount (DECRGN_OBJ_CAL) described below is carried out, and the flow proceeds to step S256.

In step S256, it is determined whether or not the energy storage zone D flag F_ESZONED is 1. This flag is set in the case that the zone of the remaining battery capacity battery 3 is, for example, equal to or greater than 80%. In the case that the result of the determination is YES, the flow proceeds to step S270, and in the case that the result of the determination is NO, the flow proceeds to step S257. This processing is set because a restriction on the regeneration must be added in the case that the remaining battery charge is high.

In step S257, it is determined whether or not the gradual deceleration update time TDECRGN is 0. In the case that the result of the determination is YES (=0), the flow proceeds to step S258, and in the case that the result of the determination is NO, the flow proceeds to step S263.

In step S258, the gradual decrement update timer TDECRGN is set to the timer value #TMDECRGNx, which depends on the vehicle speed VP, by searching a table, and the flow proceeds to step S259. This table is set such that as the vehicle speed increases, the timer value becomes larger. Thereby, in the case that the vehicle speed is large, a sudden entry into regenerative breaking can be prevented. Moreover, the timer value #TMDECRGNx carries out switching between brake ON (#TMDECRGNB) and OFF (#TMDECRGNN). In this manner, by searching for the timer value in a table depending on the vehicle speed VP, the freedom of the setting is increased.

In step S259, it is determined whether the decelerating regeneration calculation value DECRGN is equal to or greater than the decelerating regeneration final calculated value DECRGNF. In the case that the result of the determination is YES, the flow proceeds to step S260, and in the case that the result of the determination is NO, the flow proceeds to step S264.

In step S260, the gradual increment amount #DDECRNP is set to the gradual decrement update timer #DDECRNPx, which depends on the vehicle speed VP, by searching a table, and the flow proceeds to step S261. This table is set such that as the vehicle speed increases, the time value becomes larger. Moreover, the timer value #DDECRNPx carries out switching between brake ON (#DDECRNPB) and OFF (#DDECRNPN). In this manner, by searching for the timer value in a table depending on the vehicle speed, the freedom of the setting is increased.

In step S261, the gradual increment amount #DDECRNP is added to the decelerative regeneration final operation value DECRGNF, and the flow proceeds to step S262.

In step S262, it is determined whether or not the decelerative regeneration final operation value DECRGNF is equal to or less than the decelerative regeneration operating value DECRGN. In the case that the result of the determination is YES, the flow proceeds to step S263, and in the case that the result of the determination is NO, the processing proceeds to step S267.

In step S263, the decelerative regeneration permission flag F_DECRGN is set to 1, and in step S268, the final power generation command REGENF is set to the decelerative regeneration final operation value DECRGNF, in step S269, the final assist command value ASTPWRF is set to 0, and the control ends.

In step S267, the decelerative regeneration operation value DECRGN is set to the decelerative regeneration final operation value DECRGNF, and the flow proceeds to step S263.

In step S264, the gradual decrement amount #DDE-CRNM is set to the gradual decrement amount #DDECRNMx, which depends on the vehicle speed VP, by searching a table, and the flow proceeds to step S265. This table is set such that as the vehicle speed increases, the time value becomes larger. Moreover, the gradual decrement amount #DDECRNMx carries out switching between brake ON (#DDECRNMB) and OFF (#DDECRNMN). In this manner, by searching for the decrement amount in a table depending on the vehicle speed, the freedom of the setting is increased.

In step S265, the gradual decrement amount #DDE-CRNM is subtracted from the deceleration regeneration final operation value DECRGNF, and the flow moves to step S266.

In step S266, it is determined whether or not the deceleration regeneration final operation value DECRGNF is equal to or greater than the deceleration regeneration operation value DECRGN. In the case that the result of the determination is YES, the flow proceeds to step S263, and in the case that the result of the determination is NO, the flow proceeds to step S267.

In step S270, it is determined whether or not the deceleration regeneration permission flag F_DECRGN is 1. In the case that the result of the determination is YES, the flow proceeds to step S271, and in the case that the result of the determination is NO, the flow proceeds to step S276.

In step S276, the deceleration regeneration final operation value DECRGNF is set to 0, in step S277 the deceleration regeneration permission flag F_DECRGN is set to 1, and the flow proceeds to step S268.

In step S271, it is determined whether the vehicle was previously in the deceleration regeneration mode. In the case that the result of the determination is YES, the flow proceeds to step S272, and in the case that the result of the determination is NO, the flow proceeds to step S276.

In step S272, it is determined whether or not the gradual decrement update timer TDECRND is 0. In the case that the result of the determination is YES, the flow proceeds to step S273, and in the case that the result of the determination is NO, the flow proceeds to step S263.

In step S273, the gradual decrement update timer TDECRND is set the timer value #TMDECRND, and in step S274, the gradual decrement amount #DDECND is subtracted from the deceleration regeneration final operation value DECRGNF.

In step S275, it is determined whether or not the deceleration regeneration final operation value DECRGNF is equal to or less than 0. In the case that the result of the determination is YES, the flow proceeds to step S276, and in the case that the result of the determination is NO, the flow proceeds to step S263.

Figure 12:
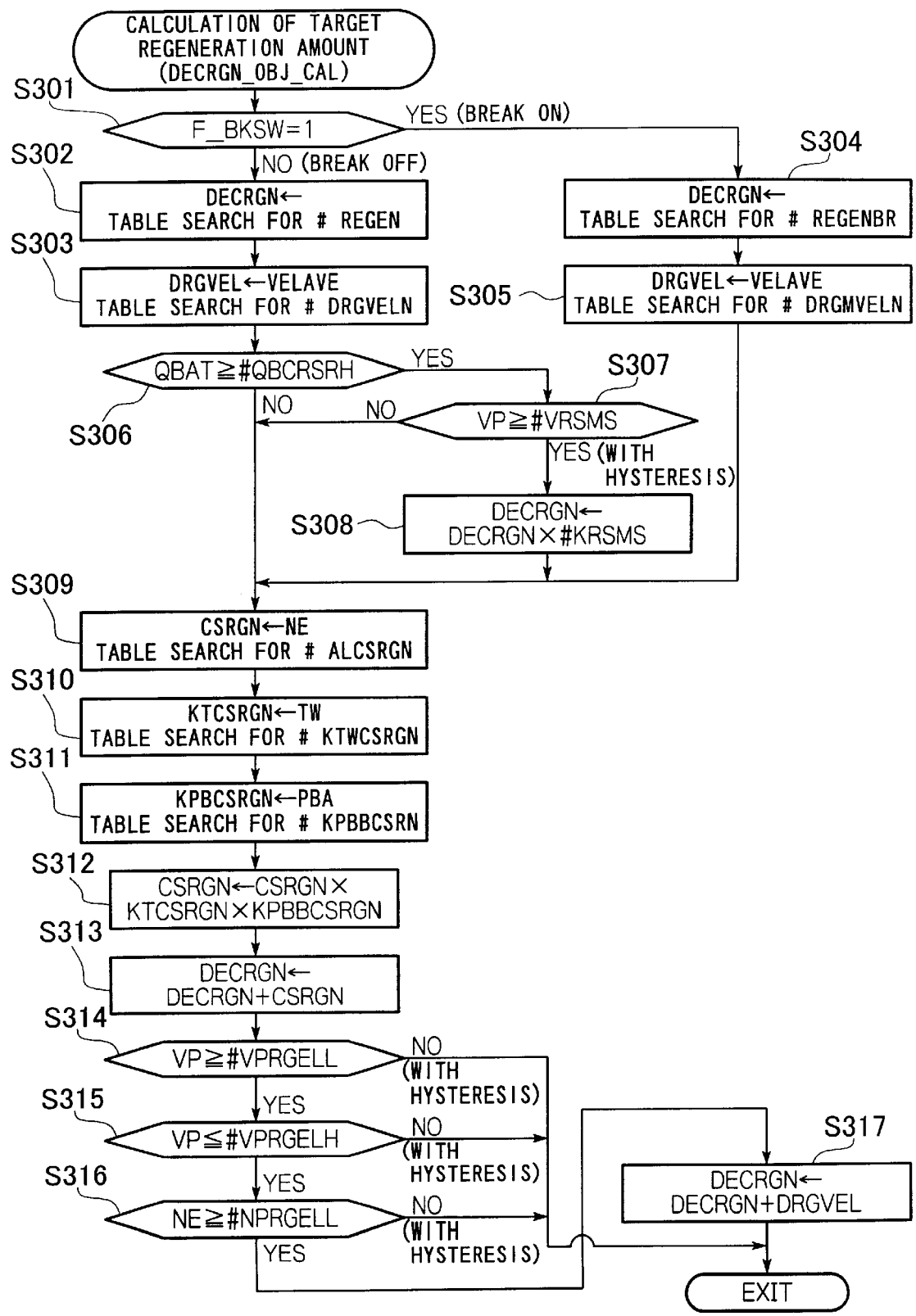
FIG. 12 is a flowchart of the target regeneration amount calculation of the embodiment.

In this manner, in the case of entering the deceleration mode or in the case or exiting the deceleration mode, by respectively gradually adding or gradually subtracting the amount of regeneration, a smooth transition can be realized.
Calculation of the Deceleration Target Regeneration Amount Next, the calculation processing for the amount of the target regeneration in step S255 in FIG. 10 will be explained while referring to FIG. 12. This target regeneration amount exceeds that of the conventional technology described above. Moreover, the following processing is repeated at a predetermined cycle.

In step S310, it is determined whether or not the brake switch flag F_BKSE is 1. In the case that the result of the determination is YES (brake ON), the flow proceeds to step S304, and in the case that the result of the determination is NO (brake OFF), the flow proceeds to step S302. The amount of regeneration increases when the brake is pressed.

In step S302, the decelerative regeneration operation value DECRGN is set to the operation value #REGEN, which are searched for by using separate tables for MT and CVT, and the flow proceeds to step S303. Here, the operation value is set in the MT table depending on the engine rotation speed and in the CVT table depending on the vehicle speed. Moreover, the table in step S302 is switched ON or OFF by the air conditioner. In addition, the table for the MT vehicle is switched for each gear position.

In step S303, the compensation value #DRGVELN is searched for in a table according to the average consumption voltage VELAVE of the auxiliary battery 4, the decelerative regeneration assist amount DRGVEL is set to this compensation value #DRGVELN, and the flow proceeds to step S306. The compensation value is set in order to change the amount of regeneration depending on the consumption amount of the auxiliary battery. Moreover, this compensation amount is added in the step S317 described below.

In step S304, the deceleration regeneration operation value DECRGN is set to the operation value #REGENBR, which are searched for by using separate tables for MT and CVT, and the flow proceeds to step S305. Here, the operation value is set in the MT table depending on the engine rotation speed and in the CVT table depending on the vehicle speed. Moreover, the table in step S304 is switched ON or OFF by the air conditioner. In addition, the table for the MT vehicle is switched for each gear position.

In step S305, the compensation value #DRGBVELN is searched for in a table according to the average consumption voltage VELAVE of the auxiliary battery 4, the deceleration regeneration assist amount DRGVEL is set to this compensation value #DRGBVELN, and the flow proceeds to step S309.

In step S306, it is determined whether or not the remaining battery capacity QBAT is equal to or larger than a predetermined remaining charge #QBCRSRH (with hysteresis). In the case that the result of the determination is YES, the flow proceeds to step S307, and in the case that the result of the determination is NO, the flow proceeds to step S309.

In step S307, it is determined whether or not the vehicle speed VP is equal to or greater than the predetermined vehicle speed #VRSMS. In the case that the result of the determination is YES, the flow proceeds to step S308, and in the case that the result of the determination is NO, the flow proceeds to step S309.

In step S308, the deceleration regeneration operation value DECRGN is set to a value multiplied by the constant #KRSM as the new decelerative regeneration operation value DECRGN, and the flow proceeds to step S309. Specifically, in step S307, the remaining battery capacity QBAT is sufficient and in step S308 the vehicle speed has a high speed, so the regenerative restriction becomes large, and thus when normal regenerative breaking is applied, because the feeling of deceleration becomes large, the driver presses the accelerator, and fuel consumption efficiency deteriorates. In order to prevent this, in step S308 the deceleration regeneration operation value DECRGN is made small by compensation by being multiplied by a coefficient #KRSMS.

Figure 13:
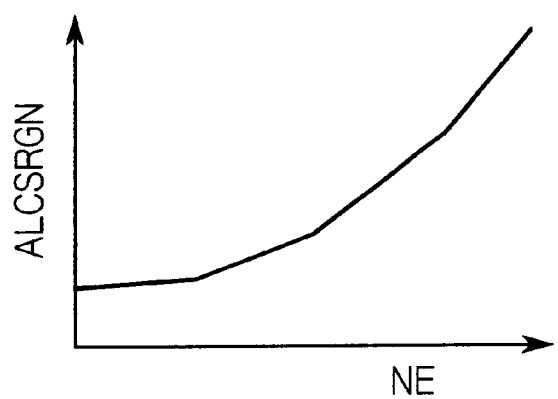
FIG. 13 is a graph showing the table of step S309.

In step S309 (compensation amount calculating device), the all cylinders deactivation regeneration calculating value (compensation amount) CSRGN is set to the operation value #ALCSRGN, which depends on the engine rotation speed NE, by searching a table (FIG. 13), and the flow proceeds to step S310. Here, the table represents the difference between the engine friction during normal operation and the engine friction during all cylinders deactivated operation. Moreover, the reason for making the table search using the engine rotation speed NE as a reference is that the engine friction is determined by the engine rotation speed NE.

In step S310, the all cylinders deactivated regeneration operation compensation coefficient KTCSRGN is set to the compensation coefficient #KTWCSRGN, which depends on the engine water temperature TW, by searching a table, and the flow proceeds to step S311. Here, the reason for using the engine water temperature TW is that, for example, when the engine water temperature TW is low, the engine friction becomes large and the like, and the engine friction is greatly influenced by the engine water temperature. Moreover, the oil temperature TOIL described above can be used in place of the engine water temperature TW.

Figure 14:
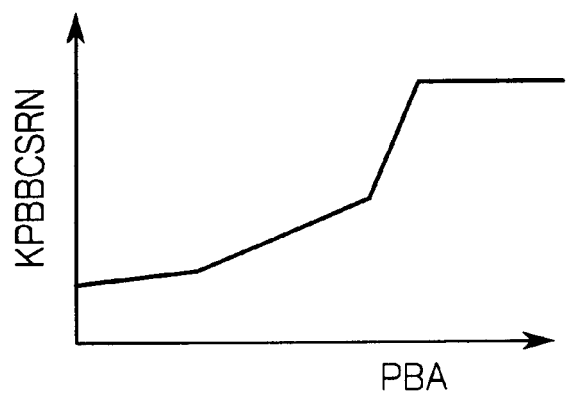
FIG. 14 is a graph showing the table of step S311.

In step S311 (the intake negative pressure calculating device), the all cylinders deactivated regenerative intake pipe negative pressure compensation coefficient KPBCSRGN is set to the intake pipe negative pressure compensation coefficient #KPBBCSRGN, which depends on the intake pipe negative pressure PBA, by searching a table (FIG. 14), and the flow proceeds to step S312. By using the intake pipe negative pressure PBA in this manner, the coefficient can be gradually changed in the stages of moving from the normal operation in which the intake pipe negative pressure is large (intake pipe negative pressure compensation coefficient #KPBBCSRGN=1) to all cylinder deactivated operation in which the intake pipe negative pressure is high (intake pipe negative pressure compensation coefficient #KPBBCSRGN=0), and from all cylinder deactivation operation to normal operation.

Specifically, in the case that the all cylinders deactivation is being carried out during deceleration, it is necessary in the end to close the intake valve and the exhaust valve, but confirmation of this cannot be correctly understood even if the flag value of the all cylinders deactivation execution flag F_ALCS has been confirmed. Thus, in order to detect whether the intake valve and the exhaust valve are closed, detecting the intake pipe negative pressure is reliable.

This is reflected in the all cylinders deactivated regeneration operation value CSRGN by changing the intake pipe negative pressure compensation coefficient #KPBBCSRGN depending on this intake pipe negative pressure, and a continuous feeling of deceleration is obtained. Moreover, depending on the flag value (1 or 0) of the all cylinders deactivated execution flag F_ALCS, the table (FIG. 14) of the intake pipe negative pressure compensation coefficient #KPBBCSRGN described above is switched, and by changing the properties of the case of entering the all cylinders deactivated operation and the case of leaving the all cylinders deactivated operation, the product can be made more saleable.

In step S312, the all cylinders deactivated regeneration operation value CSRGN is set to a value by multiplying it by the all cylinders deactivated regeneration operation compensation coefficient KTCSRGN and the intake pipe negative pressure compensation coefficient #KPBBCSRGN as the new all cylinders deactivated regeneration operation value CSRGN, and the flow proceeds to step S313. As a result of the processing in this step, an all cylinders deactivated regeneration operation value CSRGN is found that takes into account the engine water temperature TW and the intake pipe negative pressure PBA.

In step S313, the all cylinders deactivated regeneration operation value CSRGN described above is added to the decelerative regeneration operation value DECRGN found in step S308 described above, this value is set as the new decelerative regeneration operation value DECRGN, and the flow proceeds to step S314. Thereby, while providing a sense of deceleration that is identical to that of normal operation, a larger amount of regeneration can be guaranteed.

In step S314, it is determined whether or not the vehicle speed VP is equal to or greater than a predetermined value #VPRGELL (for example, 20 km/h). In the case that the determination is YES, the flow proceeds to step S315, and in the case that the result of the determination is NO, the control ends.

In step S315, it is determined whether or not the vehicle speed VP is equal to or less than a predetermined value #VPRGELH (for example, 90 km/h). In the case that the determination is YES, the flow proceeds to step S316, and in the case that the result of the determination is NO, the control ends.

In step S316, it is determined whether or not the engine rotation speed NE is equal to or greater then a predetermined value #NPRGELL. In the case that the determination is YES, the flow proceeds to step S317, and in the case that the result of the determination is NO, the control ends.

In step S317, the decelerative regeneration compensation amount DRGVEL of step S303 described above is added to the decelerative regeneration operation value DECRGN, this value is set as the new decelerative regeneration compensation amount DRGVEL, and the control ends. Thereby, in the case that the consumption of the auxiliary battery 4 is large, the supply of the amount of regeneration to the battery 3 can be guaranteed by increasing the amount of the decelerative regeneration.

Moreover, the predetermined value #VPRGELL in step S314, the predetermined value #VPRGELH in step S315, and the predetermined value #NPRGELL in step S316, all described above, are values having hysteresis.

"Engine rotation speed increase signal determination processing for a CVT vehicle"

Figure 15:
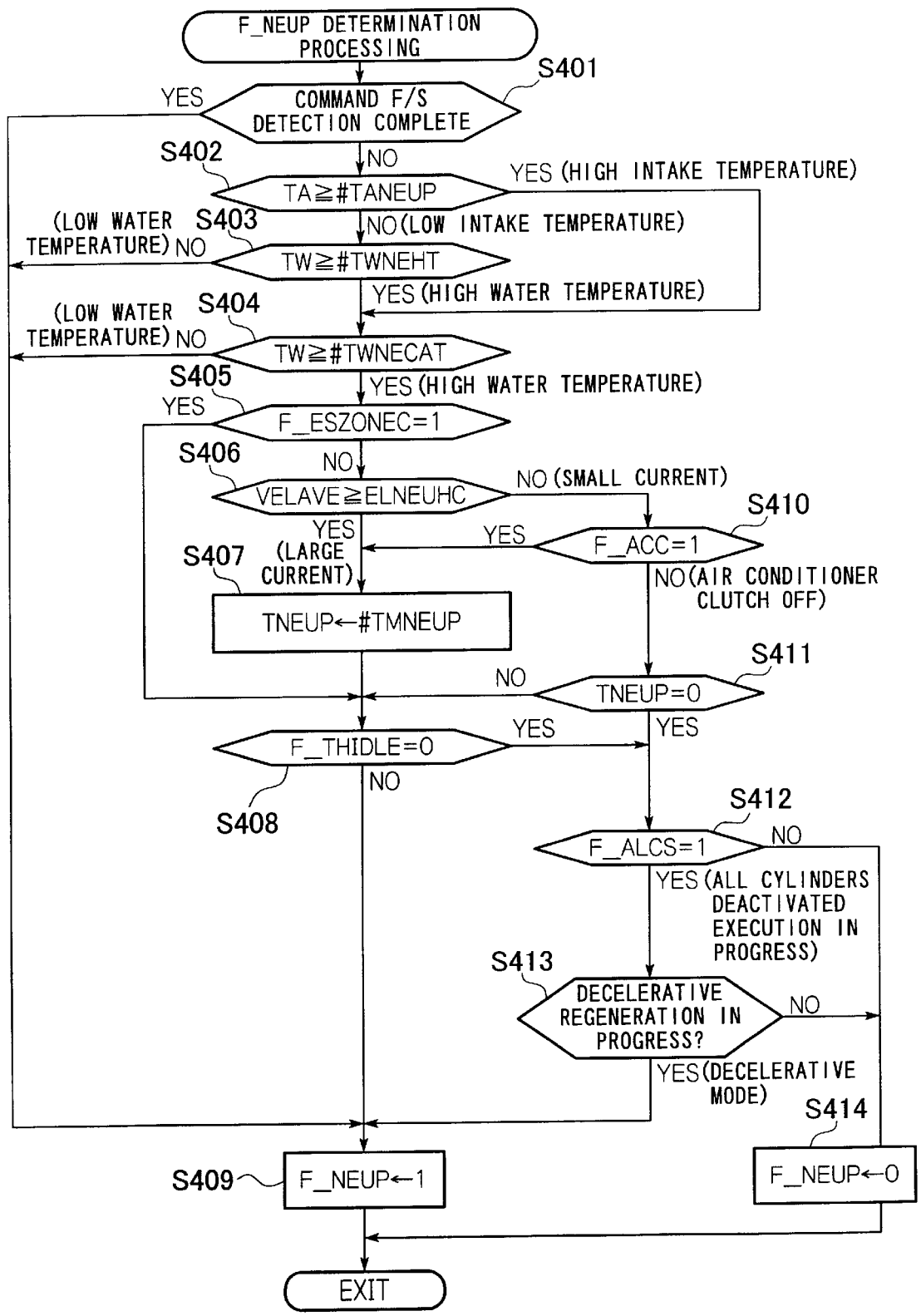
FIG. 15 is a flowchart showing the engine rotation speed increase determination processing in the CVT vehicle according to the embodiment of the present invention.

Next, the engine rotation speed increase signal determination processing for a CVT vehicle will be explained while referring to FIG. 15.

In a CVT vehicle, in the case that constant conditions are satisfied, processing to increase the engine rotation speed NE is carried out, but during this processing, conditions related to all cylinders deactivated are added. Specifically, during all cylinder deactivated operation, as explained above, the friction of the engine E decreases, and the amount of regeneration can be increased by an amount equivalent to this decrease. In this case, regeneration due to high torque acts as a cause of heat generation in the electric motor, and thus the heat load on the electric motor is decreased by increasing the number of rotation speeds (of the input axle) of the CVT, that is, the engine rotation speed NE. At the same time, the amount of regeneration is increased. That is, this is carried out by changing the gear ratio of the CVT so that the input side gear ratio of the CVT increases.

Figure 16:
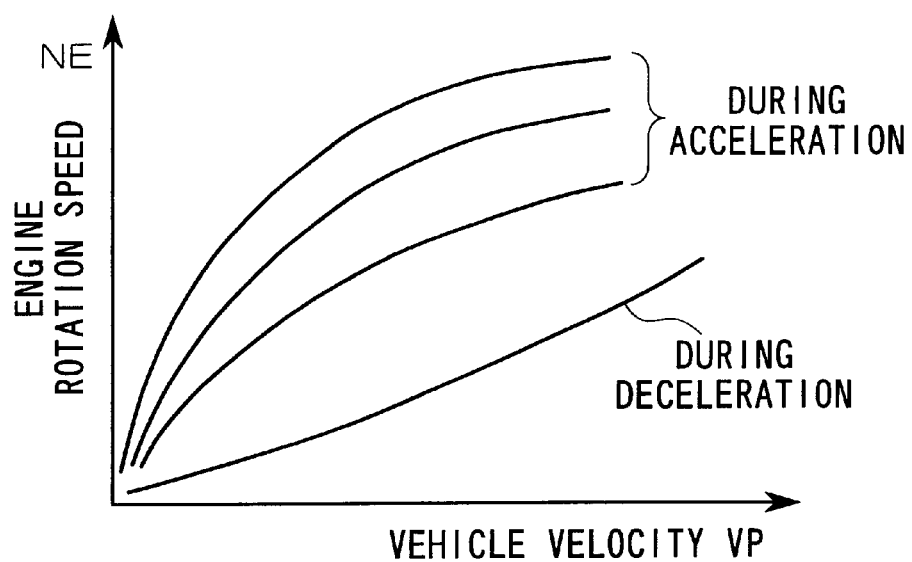
FIG. 16 is a flowchart showing the relationship between the vehicle speed VP and the number of engine rotation speed NE in the CVT vehicle according to the embodiment of the present invention.

Concretely, in this flowchart, the setting and resetting of the engine rotation speed increase flag F_NEUP is carried out. When 1 is set in the engine rotation speed increase flag F_NEUP, the engine rotation speed NE increases. When the engine rotation speed increase flag F_NEUP is set to 0, a map value of a normal throttle OFF is read. As shown in FIG. 16, in a CVT vehicle during acceleration for similar vehicle speed in each range, a map is used that increases the engine rotation speed depending on how far the throttle is opened. In contrast, during deceleration, because a single throttle OFF map is used for the vehicle speed, an engine rotation speed NE determined by the vehicle speed VP is set, and the engine rotation speed NE is lowered depending on the lowering of the vehicle speed VP. Specifically, in the case that the engine rotation speed increase flag F_NEUP is set, the throttle OFF map during deceleration is raised a predetermined amount. Moreover, in order to prevent high torque regeneration, preferably the amount of the increase becomes large in proportion to the decrease in the velocity.

In this manner, by increasing the engine rotation speed NE, in the case that all cylinders deactivation is not carried out, while the driver feels an equivalent deceleration, an increase in the amount of regeneration equivalent to the decrease in engine friction due to all cylinders deactivation operation can be implemented. Moreover, without increasing the amount of regeneration, decreasing only the torque applied to the electric motor is also possible.

In step S401, it is determined whether or not the indicated F/S (failsafe) detection is complete. In the case that the result of the determination is NO, the flow proceeds to step S402, and in the case that the result of the determination is YES, the flow proceeds to step S409. In step S409, control is ended by setting the engine rotation speed increase signal determination flag F_NEUP to 1. In the case that some sort of abnormality occurs, the engine rotation speed is increased and the battery is charged in order to make the vehicle be more drivable.

In step S402, it is determined whether or not the intake temperature TA (identical to the exterior air temperature) is equal to or greater than the engine rotation speed increase required determination intake temperature #TANEUP. In the case that the result of the determination is YES (high intake temperature), the flow proceeds to step S404, and in the case that the result of the determination is NO (low intake temperature), the flow proceeds to step S403.

In step S403, it is determined whether or not the cooling water temperature TW is equal to or greater than the engine rotation speed increase required determination heater cooling water temperature #TWNEHT. In the case that the result of the determination is YES (high water temperature), the flow proceeds to step S404, and in the case that the result of the determination is NO (low water temperature), the flow proceeds to step S409.

This is because it is necessary to increase the engine rotation speed as a result of the requirements of the heater to guarantee the heater capacity when the external air temperature TA and the cooling water temperature TW are low due to the processing in step S402 and step S403.

In step S404, it is determined whether or not the cooling water temperature TW is equal to or greater than the engine rotation speed increase requirement determination catalyser cooling water temperature #TWNEHT. In the case that the result of the determination is YES, (high water temperature, the flow proceeds to step S405, and in the case that the result of the determination is NO (low water temperature), the flow proceeds to step S409. Even in the case that it is determined that the intake temperature is high, by increasing the engine rotation speed NE, the temperature of the catalyser that is the catalyst is increased rapidly in order to maintain the low emission region.

In step S405, it is determined whether or not the energy storage zone C flag F_ESZONEC is 1. In this zone, a flag is set when the remaining battery capacity QBAT is, for example, equal to or less than 20%. In the case that the result of the determination is YES, the flow proceeds to step S408, and in the case that the result of the determination is NO, the flow proceeds to step S406. When the remaining battery capacity is low, in step S408, which is described below, assuming that the throttle is open, it is necessary to raise the engine rotation speed NE and increase the remaining battery capacity QBAT.

In step S406, it is determined whether or not the average consumed current VELAVE of the auxiliary battery 4 is equal to or greater than the consumed current threshold #ELNEUHC (a value that includes hysteresis). In the case that the result of the determination is YES (high current), the flow proceeds to step S407, and in the case that the result of the determination is NO (low current), the flow proceeds to step S410.

Even if the remaining battery capacity QBAT is sufficient, in the case that the average consumed current VALAVE is equal to or greater than the consumed voltage threshold #ELNEUHC, which is described below, assuming that the throttle is open in step S408, it is necessary to increase the efficiency of power generation by raising the engine rotation speed NE in step S409.

In step S407, the engine rotation speed increase timer TNEUP is set to the timer value #TMNEUP, and the flow proceeds to step S408.

In step S408, it is determined whether or not the idle determination flag F_THIDLE is 0. In the case that the result of the determination is YES (the throttle is closed), the flow proceeds to step S412. In the case that the result of the determination is NO (the throttle is open), the flow proceeds to step S409.

In step S410, it is determined whether or not the air conditioner ON flag F_ACC is 1. In the case that the result of the determination is YES (the air conditioner clutch is ON), the flow proceeds to step S407, and in the case that the result of the determination is NO, (the air conditioner clutch is OFF), the flow proceeds to step S411. In the case that the air conditioner is ON, it is necessary to increase the output because, for example, the feeling of acceleration is guaranteed by raising the engine rotation speed.

In step S411, it is determined whether or not the engine rotation speed increase timer TNEUP is 0. In the case that the result of the determination is YES, the processing proceeds to step S412, and in case that the result of the examination is NO, the flow proceeds to step S408. This is in order to guarantee a constant time interval in transferring to the determination processing (step S412 and step S413) related to the all cylinders deactivation described below, a constant time is guaranteed.

In step S412, it is determined whether or not the all cylinders deactivation execution flag F_ALCS is 1. In the case that the result of the determination is YES (all cylinders deactivated operation in progress), the flow proceeds to step S413, and in the case that the result of the determination is NO (normal operation in progress), the flow proceeds to step S414. In step S414, the engine rotation speed increase signal determination flag F_NEUP is set to 0, and the control ends. In this case, the engine rotation speed is increased.

In step S413, it is determined whether or not the deceleration regeneration is in progress. In the case that the result of the determination is YES (deceleration mode), the flow proceeds to step S409, and in the case that the result of the determination is NO (other than deceleration mode), the flow proceeds to step S414.

By step S412 and step S413, during all cylinders deactivated operation and during deceleration regeneration, even if the throttle is closed, the amount of regeneration is increased by increasing the engine rotation speed NE.

Next, the operation of the present invention will be explained.

Figure 6:
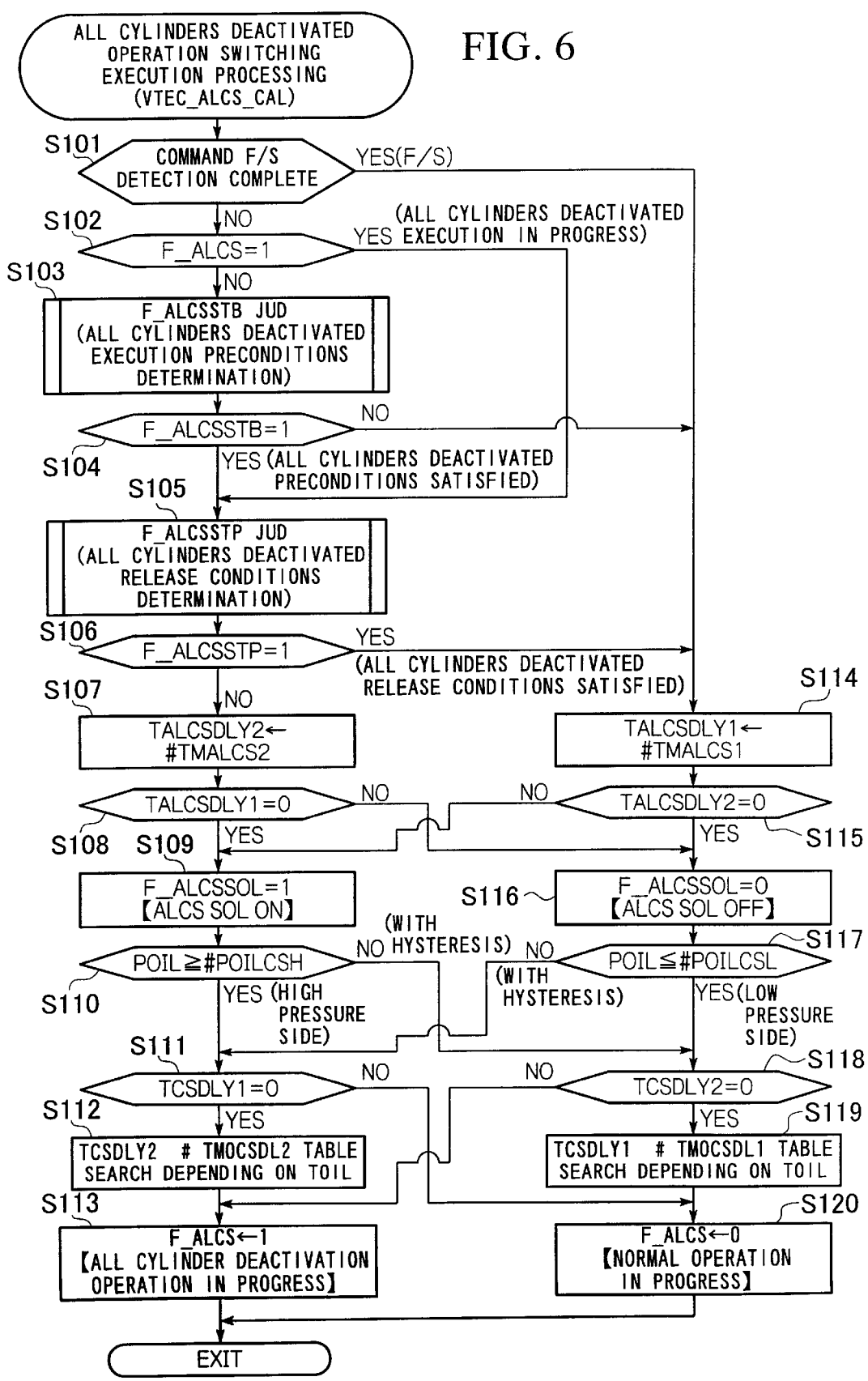
FIG. 6 is a flowchart showing the no cylinder driving switching execution processing of the embodiment.
Figure 7:
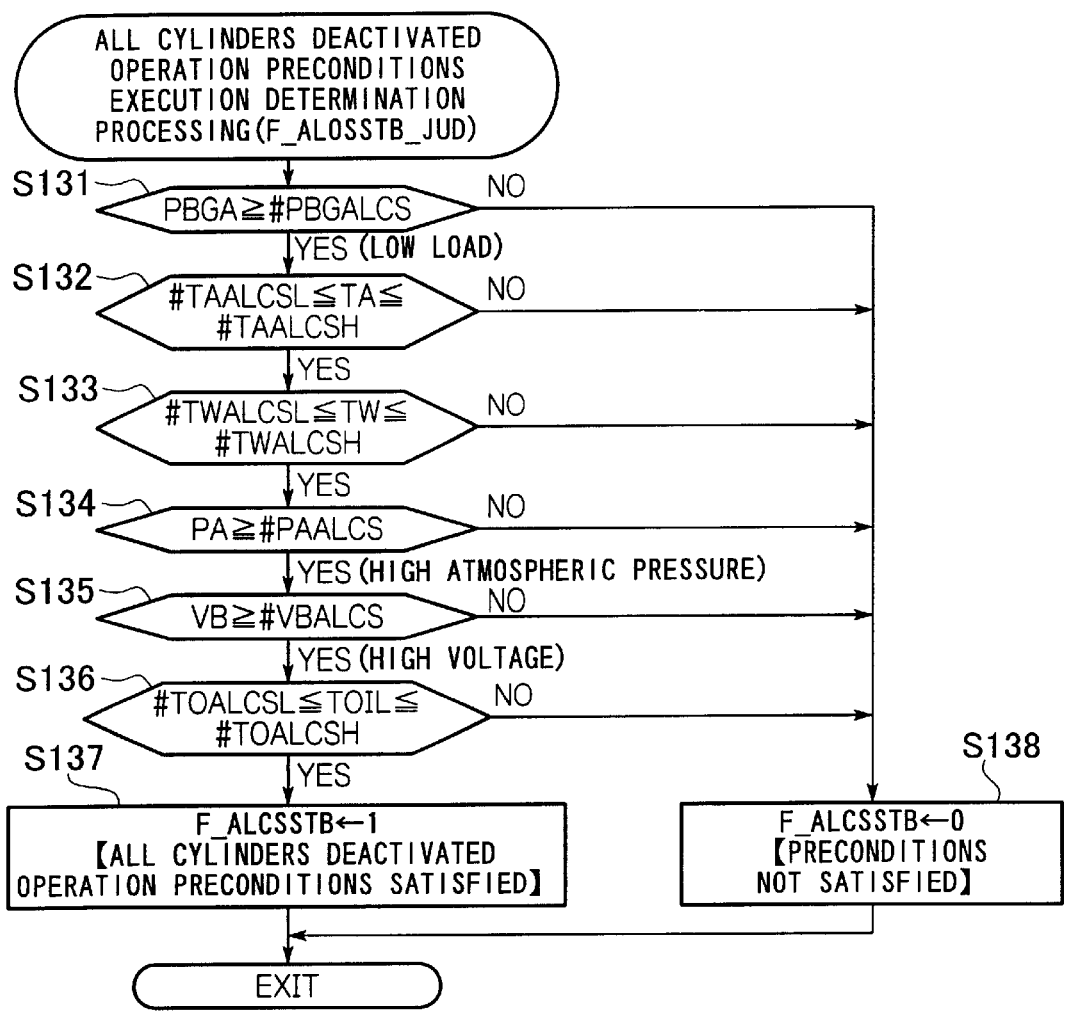
FIG. 7 is a flowchart showing the no cylinder driving precondition implementation determination processing of the embodiment.
Figure 8:
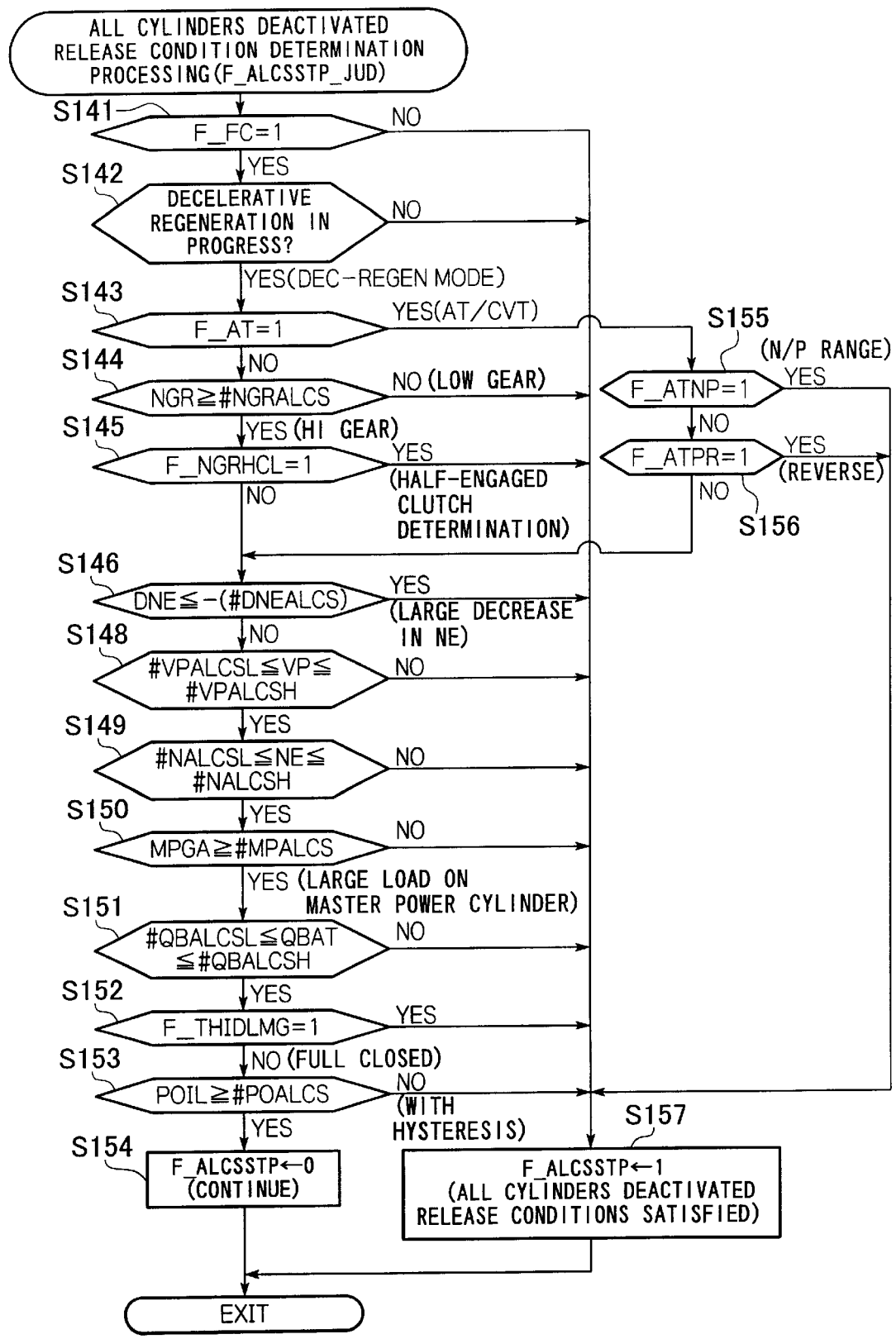
FIG. 8 is a flowchart showing the no cylinder release condition determination processing of the embodiment.

Therefore, in the case that a vehicle is traveling in a mode other than the deceleration mode, in step S141 in FIG. 8, the fuel cut flag F_FC becomes 0, the all cylinders deactivated release conditions are satisfied (F_ALCSSTP=1), and the determination in step S106 in FIG. 6 is YES. Thus, in step S120 the all cylinders deactivated execution flag F_ALCS becomes 0, and the all cylinder deactivation is not carried out.

Figure 9:
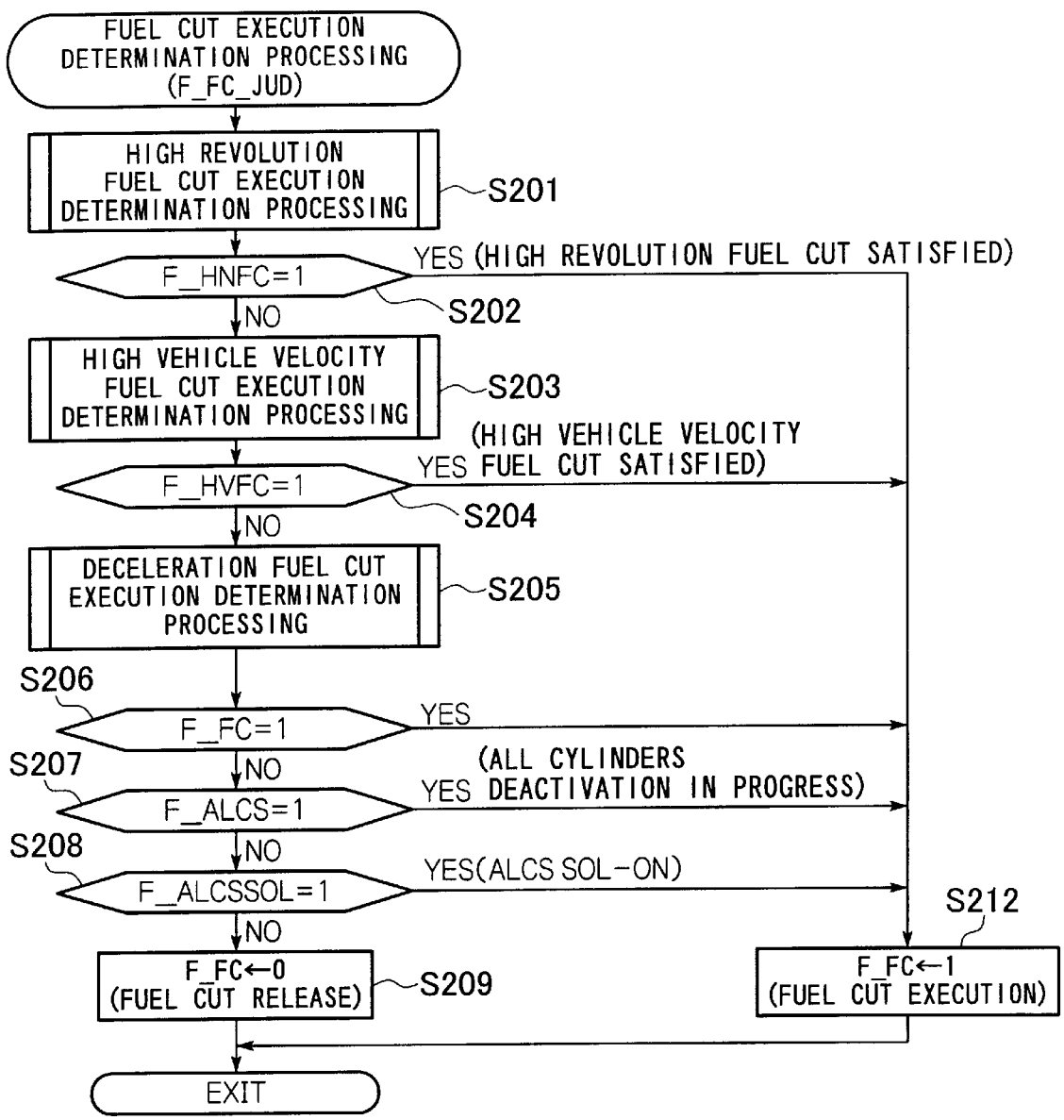
FIG. 9 is a flowchart showing the fuel cut execution determination processing of the embodiment.
Figure 17:
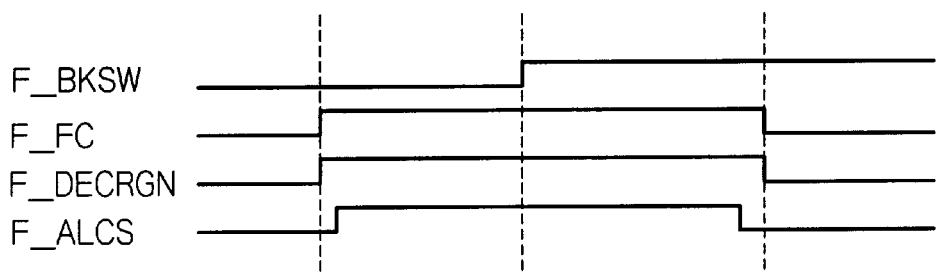
FIG. 17 is a time chart according to the embodiment of the present invention.

In contrast, when the traveling vehicle enters the deceleration regeneration mode (deceleration regeneration permission flag F_MADECRGN=1), the fuel cut flag F_FC in step S141 of FIG. 8 becomes 1, and the fuel cut flag F_FC in step S212 of FIG. 9 becomes 1. Thereby, the preconditions for all cylinders deactivation in step S104 of FIG. 6 are satisfied, then when the all cylinders deactivated release conditions in step S106 are not satisfied, and from this point in time until after the passage of a predetermined time interval (TALCSDLY1), the solenoid of the spool valve in step S109 is operated in the ON state. In addition, the oil pressure (POIL) becomes equal to or greater than a predetermined value (#POILCSH), and furthermore, after passage of a predetermined time interval (TCSDLY1) the all cylinders deactivated execution flag F_ALCS in step S113 becomes 1, and all cylinders deactivated operation is carried out. As a result, in the time chart shown in FIG. 17, the fuel cut flag F_FC and the deceleration regeneration permission flag F_MADECRGN become 1, and thus the all cylinders deactivated execution flag F_ASCS becomes 1. Moreover, when the brake is pressed during all cylinders activated operation (F_BKSW=1, S309), the amount of regeneration is increased by an amount equivalent to this step S304.

In addition, during all cylinders deactivated operation, when the all cylinders deactivated release conditions in step S106 of FIG. 6 are satisfied, from this point in time until the passage of a predetermined time interval (TALCSDLY2), in step S116 the solenoid of the spool valve is operated in the OFF state. In addition, the oil pressure (POIL) becomes equal to or less than a predetermined value (#POILCSL), and furthermore, after the passage of a predetermined time interval (TCSDLY2), in step S120, the all cylinders deactivated execution flag F_ALCS becomes 0, and the vehicle begins normal operation. Thereby, as shown in FIG. 9, after both the all cylinders deactivated execution flag F_ALCS and the all cylinders deactivated solenoid flag F_ALCSSOL become 0, as shown in the time chart in FIG. 17, the fuel cut flag F_FC (and the decelerative regeneration permission flag F_MADECRN becomes 0, that is, the fuel cut is released, and normal operation starts.

In addition, the portion of the decrease in the engine friction that has decreased due to the cylinder deactivation is calculated as the portion of the increases (all cylinders activated regeneration calculation value CSRGN) in the regeneration in step S309, and regeneration is possible by increasing this by the deceleration regenerative calculation value DECRGN calculated in steps S302 and S304, and furthermore, the regeneration is carried out gradually (S261 and S265) after passage of a predetermined time (TDECRGN) that depends on the vehicle speed (step S257).

In addition, because the compensation of the amount of regeneration is carried out (step S311) depending on the engine intake negative pressure during all cylinders deactivated execution (F_ALCS=1) and during cylinder deactivation release (F_ALCS=0), irrespective of the value of the all cylinders deactivation execution flag F_ALCS, compensation is made depending on the intake pipe negative pressure that changes between normal operation and cylinders deactivated operation.

According to the embodiment described above, basically when all cylinders deactivated is identified by the all cylinders deactivated execution flag F_ALCS (=1) during decelerative fuel cut, because deactivated cylinder operation is possible by a variable valve timing mechanism VT, a fuel cut is carried out along with all cylinder deactivation, and thus the amount of fuel consumption is restrained, and an improvement in fuel consumption can be implemented.

The release of the all cylinders deactivated is identified by the all cylinders deactivated execution flag F_ALCS (=0), and in the case that a non-operational state of the variable valve timing mechanism VT is detected by the all cylinders deactivated operation solenoid flag F_ALCSSOL, the supply stoppage to the engine is released, and its reopening becomes possible. Thus, fuel is not supplied during all cylinders deactivation, the movement from all cylinders deactivated operation to normal operation can be carried out smoothly without wasting fuel.

In addition, the decreased part of the engine friction that has decreased as a result of the cylinder deactivation is calculated as the part of the increased amount of the regeneration (all cylinders regeneration calculation value CSRGN), this is added to the decelerative regeneration calculation value DECRGN and this regeneration is carried out gradually after the passage of a predetermined time interval (TDECRGN) depending on the vehicle speed, and thus, improvement in consumption can be implemented, and at the same tie, even if cylinder deactivation is carried out. Thereby the decreasing decelerating feeling can be set identically to normal operation by the increased amount of normal operation. Thus, the driver experiences no sort of discomfort.

Furthermore, because the compensation of the amount of regeneration is carried out depending on the engine intake negative pressure during all cylinders deactivated execution and all cylinders deactivated release (S 311), irrespective of the execution of the all cylinders deactivated, compensation is possible that corresponds to the intake pipe negative pressure that changes during normal operation and the cylinders deactivated operation, and thus between the all cylinders deactivated operation and normal operation, a feeling of continuous deceleration is obtained.

In addition, because the all cylinders deactivated execution flag F_ALCS is 1, that is, during all cylinders deactivated operation, the gear ratio of the gearbox is changed such that the input side gear ratio of the CVT changes and the engine rotations NE increases, the regeneration energy corresponding to the decreased engine friction due to the cylinder deactivation can be guaranteed by increasing the engine rotation speed. Therefore, in the CVT vehicle there is no adverse effect of the feeling of deceleration, and an increase in regeneration and a decrease in the heat loss of the electric motor can be realized.

As explained above, according to a first aspect of the present invention, because regeneration can be carried out by calculating the decreased portion of the engine friction that decreases as a result of the cylinder deactivation by the compensation amount calculating device, and increasing this portion of the amount of the regeneration by the amount of regeneration calculated by the regeneration amount calculating device, improvements in fuel consumption can be implemented and at the same time, even when cylinder deactivation is carried out, the feeling of deceleration decreased thereby is equivalent to that during normal operation due to the increase in the amount of regeneration, and thus there is the effect that the driver is not adversely affected by any feeling of discomfort.

According to a second aspect of the invention, in addition to being able to increase the amount of regeneration by carrying out cylinder deactivation, the amount of fuel consumption can be reduced.

According to a third aspect of the present invention, there is the effect that the freedom of the settings is increased by setting according to vehicle speed the predetermined time that depends on the vehicle speed. In addition, by gradually carrying out compensation of the amount of regeneration, in the case of entering the deceleration mode and the case of leaving the deceleration mode, there is the effect that a smooth transition can be realized.

According to a fourth aspect of the present invention, because compensation that depends on the intake pipe negative pressure that changes between the normal operation and cylinder deactivated operation becomes possible, and thus a feeling of continuous deceleration between the cylinders deactivated operation and normal operation can be obtained.

According to a fifth aspect of the present invention, because guaranteeing the regeneration energy corresponding the engine friction that has decreased as a result of the cylinder deactivation by increasing the engine rotation speed becomes possible, there are the effects that the feeling of deceleration is not adversely affected, and an increase in the amount of regeneration and a decrease in the heat load of the electric motor can be realized.

What is claimed is:

1. A control apparatus for a hybrid vehicle comprising an engine and electric motor as driving power of the hybrid vehicle, wherein the electric motor carries out regenerative braking depending on the deceleration state of the hybrid vehicle, and said engine comprises cylinders each capable of executing a deactivation operation, the control apparatus for a hybrid vehicle comprising:

a cylinder deactivated operation determination device for determining whether it is appropriate to execute the cylinder deactivated operation depending on the driving conditions of the vehicle;

a regeneration amount calculating device for detecting a deceleration state of the vehicle and for calculating the amount of regeneration due to said electric motor during deceleration, and the regeneration amount calculating device further comprises:

a compensation amount calculating device for calculating a compensation amount associated with cylinder operation energy in terms of the engine rotation speed, which is recovered by the cylinder deactivated operation executed by said cylinder deactivated operation determination device while the electric motor is in the deceleration regeneration, wherein said electric motor executes regeneration so as to generate an amount of regeneration energy determined both by said regeneration amount calculating device and said compensation amount calculating device.

2. A control apparatus for a hybrid vehicle according to claim 1, wherein the control apparatus further comprises a fuel supply stop device, which stops the fuel supply to the engine while the vehicle is in the deceleration state.

3. A control apparatus for a hybrid vehicle according to claim 1, wherein the compensation of the regeneration amount by said compensation amount calculation device is gradually performed after the passage of a predetermined time interval which depends on the vehicle speed.

4. A control apparatus for a hybrid vehicle according to claim 1, wherein said compensation amount calculation device further comprises an intake negative pressure compensation device for executing compensation of the regeneration amount depending on the engine intake negative pressure at the time of executing the cylinder deactivation operation and at the time of releasing the cylinder deactivation operation by a cylinder deactivation determination device.

5. A control apparatus for a hybrid vehicle according to claim 1, wherein, when said cylinder deactivated operation determination device determines that it is possible to execute the cylinder deactivated operation, a gear ratio of a transmission is changed so as to increase an input side gear ratio so that the engine rotation speed is increased.

* * * * *